(12) United States Patent
Gally et al.

(10) Patent No.: US 8,031,133 B2
(45) Date of Patent: Oct. 4, 2011

(54) METHOD AND DEVICE FOR MANIPULATING COLOR IN A DISPLAY

(75) Inventors: Brian J. Gally, Los Gatos, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1471 days.

(21) Appl. No.: 11/178,211

(22) Filed: Jul. 8, 2005

(65) Prior Publication Data

US 2006/0077124 A1    Apr. 13, 2006

Related U.S. Application Data

(60) Provisional application No. 60/623,072, filed on Oct. 28, 2004, provisional application No. 60/613,491, filed on Sep. 27, 2004, provisional application No. 60/613,535, filed on Sep. 27, 2004.

(51) Int. Cl.
*G09G 3/00* (2006.01)

(52) U.S. Cl. .............. 345/32; 345/83; 345/84; 359/242

(58) Field of Classification Search .................. 345/84, 345/32, 30, 83, 85, 694, 696; 359/290, 237, 359/292, 298, 242; 353/20, 33; 385/1; 349/9; 348/750, 771; 430/293; 355/32
See application file for complete search history.

(56) References Cited

U.S. PATENT DOCUMENTS

| | | | |
|---|---|---|---|
| 3,448,334 A | 6/1969 | Frost | |
| 4,441,791 A | 4/1984 | Hornbeck | |
| 4,878,741 A | 11/1989 | Fergason | |
| 5,142,414 A | 8/1992 | Koehler | |
| 5,168,406 A | 12/1992 | Nelson | |
| 5,327,263 A | 7/1994 | Katagiri | |
| 5,452,024 A | 9/1995 | Sampsell | |
| 5,589,852 A | 12/1996 | Thompson et al. | |
| 5,619,059 A | 4/1997 | Li et al. | |
| 5,638,084 A | 6/1997 | Kalt | |
| 5,737,115 A | 4/1998 | Mackinlay et al. | |
| 5,771,321 A | 6/1998 | Stern | |

(Continued)

FOREIGN PATENT DOCUMENTS

EP    0 366 117    5/1990

(Continued)

OTHER PUBLICATIONS

Miles, M.W., "A MEMS Based Interferometric Modulator (IMOD) for Display Applications", Proceedings of Sensors Expo, XX, XX Oct. 21, 1997, pp. 281-284, XP009058455.

(Continued)

*Primary Examiner* — Abbas I Abdulselam
(74) *Attorney, Agent, or Firm* — Knobbe, Martens, Olson & Bear LLP

(57) ABSTRACT

A method and device for manipulating color in a display includes a display in which one or more of the pixels includes one or more display elements, such as interferometric modulators, configured to output colored light and one or more display elements configured to output white light. Other embodiments include methods of making such displays. In addition, embodiments include color displays configured to provide a greater proportion of the intensity of output light in green portions of the visible spectrum in order to increase perceived brightness of the display.

77 Claims, 14 Drawing Sheets

U.S. PATENT DOCUMENTS

| | | | |
|---|---|---|---|
| 5,986,796 | A | 11/1999 | Miles et al. |
| 6,028,690 | A | 2/2000 | Carter et al. |
| 6,040,937 | A | 3/2000 | Miles |
| 6,055,090 | A | 4/2000 | Miles |
| 6,088,102 | A | 7/2000 | Manhart |
| 6,137,904 | A | 10/2000 | Lubin et al. |
| 6,195,196 | B1 | 2/2001 | Kimura |
| 6,213,615 | B1 | 4/2001 | Siitari |
| 6,229,916 | B1 | 5/2001 | Ohkubo |
| 6,301,000 | B1 | 10/2001 | Johnson |
| 6,323,834 | B1 | 11/2001 | Colgan |
| 6,342,970 | B1 | 1/2002 | Sperger |
| 6,356,378 | B1 | 3/2002 | Huibers |
| 6,421,054 | B1 | 7/2002 | Hill et al. |
| 6,570,584 | B1 | 5/2003 | Cok et al. |
| 6,643,069 | B2 | 11/2003 | Dewald |
| 6,650,455 | B2 | 11/2003 | Miles |
| 6,674,562 | B1 | 1/2004 | Miles |
| 6,680,792 | B2 | 1/2004 | Miles |
| 6,747,785 | B2 | 6/2004 | Chen et al. |
| 6,760,146 | B2 | 7/2004 | Ikeda et al. |
| 6,768,555 | B2 | 7/2004 | Chen |
| 6,798,469 | B2 | 9/2004 | Kimura |
| 6,822,780 | B1 | 11/2004 | Long |
| 6,825,969 | B2 | 11/2004 | Chen et al. |
| 6,862,029 | B1 | 3/2005 | D'Souza et al. |
| 6,867,896 | B2 | 3/2005 | Miles |
| 6,912,022 | B2 | 6/2005 | Lin |
| 6,930,816 | B2 | 8/2005 | Mochizuki |
| 6,954,191 | B1 | 10/2005 | Hirano et al. |
| 6,982,820 | B2 | 1/2006 | Tsai |
| 6,995,890 | B2 | 2/2006 | Lin et al. |
| 7,006,272 | B2 | 2/2006 | Tsai |
| 7,016,095 | B2 | 3/2006 | Lin |
| 7,025,464 | B2 | 4/2006 | Beeson et al. |
| 7,034,981 | B2 | 4/2006 | Makigaki |
| 7,038,752 | B2 | 5/2006 | Lin |
| 7,042,643 | B2 | 5/2006 | Miles |
| 7,072,093 | B2 | 7/2006 | Piehl |
| 7,123,216 | B1 | 10/2006 | Miles |
| 7,126,738 | B2 | 10/2006 | Miles |
| 7,161,728 | B2 | 1/2007 | Sampsell |
| 7,172,915 | B2 | 2/2007 | Lin et al. |
| 7,176,861 | B2 * | 2/2007 | Dedene et al. ............ 345/83 |
| 7,198,973 | B2 | 4/2007 | Lin et al. |
| 7,271,790 | B2 | 9/2007 | Hudson et al. |
| 7,483,197 | B2 * | 1/2009 | Miles ..................... 359/290 |
| 7,489,428 | B2 * | 2/2009 | Sampsell et al. .......... 359/290 |
| 7,525,730 | B2 | 4/2009 | Floyd |
| 7,595,811 | B2 | 9/2009 | Matsuda |
| 7,660,028 | B2 | 2/2010 | Lan |
| 7,710,632 | B2 | 5/2010 | Cummings |
| 7,911,428 | B2 | 3/2011 | Gally |
| 2002/0054424 | A1 | 5/2002 | Miles |
| 2002/0154215 | A1 | 10/2002 | Schechterman |
| 2002/0191130 | A1 | 12/2002 | Liang et al. |
| 2003/0146893 | A1 | 8/2003 | Sawabe |
| 2003/0151821 | A1 | 8/2003 | Favalora |
| 2003/0214621 | A1 | 11/2003 | Kim |
| 2004/0051929 | A1 | 3/2004 | Sampsell |
| 2004/0066477 | A1 | 4/2004 | Morimoto |
| 2004/0080807 | A1 | 4/2004 | Chen et al. |
| 2004/0100594 | A1 | 5/2004 | Huibers |
| 2004/0113875 | A1 | 6/2004 | Miller et al. |
| 2004/0115339 | A1 | 6/2004 | Ito |
| 2004/0188599 | A1 | 9/2004 | Viktorovitch |
| 2004/0209195 | A1 | 10/2004 | Lin |
| 2004/0217919 | A1 | 11/2004 | Piehl et al. |
| 2004/0218251 | A1 | 11/2004 | Piehl et al. |
| 2004/0233503 | A1 | 11/2004 | Kimura |
| 2004/0240032 | A1 | 12/2004 | Miles |
| 2005/0002082 | A1 | 1/2005 | Miles |
| 2005/0069209 | A1 | 3/2005 | Damera-Venkata et al. |
| 2005/0195462 | A1 | 9/2005 | Lin |
| 2006/0066557 | A1 | 3/2006 | Floyd |
| 2006/0066641 | A1 | 3/2006 | Gally |
| 2006/0066938 | A1 | 3/2006 | Chui |
| 2006/0067651 | A1 | 3/2006 | Chui |
| 2006/0077127 | A1 | 4/2006 | Sampsell |
| 2006/0077148 | A1 | 4/2006 | Gally et al. |
| 2006/0077149 | A1 | 4/2006 | Gally et al. |
| 2006/0103912 | A1 | 5/2006 | Katoh |
| 2006/0250337 | A1 | 11/2006 | Miles |
| 2007/0031097 | A1 | 2/2007 | Heikenfeld |
| 2007/0247704 | A1 | 10/2007 | Mignard |
| 2008/0112031 | A1 | 5/2008 | Gally |
| 2008/0288225 | A1 | 11/2008 | Djordjev |
| 2009/0296191 | A1 | 12/2009 | Floyd |
| 2010/0245975 | A1 | 9/2010 | Cummings |
| 2011/0043889 | A1 | 2/2011 | Mignard |

FOREIGN PATENT DOCUMENTS

| | | |
|---|---|---|
| EP | 0 389 031 A | 9/1990 |
| EP | 0 695 959 | 2/1996 |
| EP | 0 786 911 | 7/1997 |
| EP | 1 205 782 | 5/2002 |
| FR | 2 760 559 | 9/1998 |
| FR | 2 760 559 A | 9/1998 |
| GB | 2 315 356 | 1/1998 |
| JP | 05 281479 | 10/1993 |
| JP | 08 018990 | 1/1996 |
| JP | 09-189910 | 7/1997 |
| JP | 10-319877 | 12/1998 |
| JP | 11 211999 | 8/1999 |
| JP | 2000 500245 | 1/2000 |
| JP | 2002 062505 A | 2/2002 |
| JP | 2002-149116 | 5/2002 |
| JP | 2002-229023 | 8/2002 |
| JP | 2003-021821 A | 1/2003 |
| JP | 2003-255324 | 9/2003 |
| JP | 2003-255379 | 9/2003 |
| JP | 2003-295160 | 10/2003 |
| JP | 2003-315732 | 11/2003 |
| JP | 2004-117815 | 4/2004 |
| JP | 2004-212673 | 7/2004 |
| JP | 2004-212922 | 7/2004 |
| JP | 2004-534280 | 11/2004 |
| JP | 2005-527861 | 9/2005 |
| WO | WO 95/30924 | 11/1995 |
| WO | WO 96/08833 | 3/1996 |
| WO | WO 99/52006 A2 | 10/1999 |
| WO | WO 03/007049 A1 | 1/2003 |
| WO | WO 03/100756 | 12/2003 |
| WO | WO 2004/068460 | 8/2004 |
| WO | WO 2006/036524 | 4/2006 |
| WO | WO 2006/036559 | 4/2006 |

OTHER PUBLICATIONS

International Search Report PCT/US2005/03773.
Austrian Search Report for U.S. Appl. No. 11/140,561 dated Jul. 12, 2005.
Official Communication in Chinese Application No. 2005800321618 dated Nov. 14, 2008.
Official Communication in Chinese Application No. 2005800321618 dated Aug. 7, 2009.
Official Communication in Mexican Application No. MX/a/2007/003581 dated Aug. 27, 2009.
International Preliminary Report on Patentability in PCT/US2005/032773 (Publication No. WO2006/036559) dated Mar. 27, 2007.
Notice of Allowance and Fees Due in U.S. Appl. No. 11/390,996 (Patent No. 7,483,197) dated Sep. 24, 2008.
Request for Continued Examination (RCE), Applicant summary of interview with examiner, and Information Disclosure Statement (IDS) in U.S. Appl. No. 11/390,996 (Patent No. 7,483,197) dated Sep. 4, 2008.
Corrected Notice of Allowance and Fees Due in U.S. Appl. No. 11/390,996 (Patent No. 7,483,197) dated Jul. 11, 2008.
Notice of Allowance and Fees Due and Examiner Interview Summary Record in U.S. Appl. No. 11/390,996 (Patent No. 7,483,197) dated Jun. 4, 2008.
Response to Office Action in U.S. Appl. No. 11/390,996 (Patent No. 7,483,197) dated Nov. 9, 2007.
Office Action in U.S. Appl. No. 11/390,996 (Patent No. 7,483,197) dated Aug. 9, 2007.

Miles, M.W., "A Mems Based Interferometric Modulator (IMOD) for Display Applications," Proceedings of Sensors Expo, pp. 281-284, Oct. 21, 1997.
Japanese Office Action for Japanese Application No. 2007-533541 dated Aug. 13, 2010.
RCE and Amendment in U.S. Appl. No. 11/118,110 dated Mar. 18, 2010.
Office Action in U.S. Appl. No. 11/118,110 dated Apr. 30, 2010.
Amendment in U.S. Appl. No. 11/118,110 dated Aug. 30, 2010.
Office Action in Mexican App. No. PA/a/2005/010238 dated Jan. 22, 2008.
Office Action in European App. No. 05255635.4 dated Mar. 1, 2010.
Office Action in Chinese App. No. 200510105830.1 dated Jun. 4, 2010.
Final Office Action in U.S. Appl. No. 11/118,605 dated Mar. 2, 2010.
RCE and Amendment in U.S. Appl. No. 11/118,605 dated Aug. 2, 2010.
Examiner Interview Summary in U.S. Appl. No. 11/118,605 dated Aug. 2, 2010.
Office Action in European App. No. 05255636.2 dated Mar. 1, 2010.
Office Action in European App. No. 06077032.8 dated Mar. 1, 2010.
"CIE Color System," available at http:hyperphysics.phy-astr.gsu.edu/hbase/vision/cie.html at least until Dec. 30, 2007.
Aratani K. et. al., "Surface Micromachined Tuneable Interferometer Array," Sensors and Actuators A, vol. A43, No. 1/3, pp. 17-23, May 1994.
Conner, "Hybrid Color Display Using Optical Interference Filter Array," SID Digest, pp. 577-580 (1993).
Miles, M., et. al., "Digital Paper™ for reflective displays," Journal of the Society for Information Display, Society for Information Display, San Jose, US, vol. 11, No. 1, pp. 209-215, 2003.
Miles, M.W., "Interferonnetric Modulation MOEMS as an enabling technology for high-performance reflective displays," Proceedings of the SPIE, vol. 4985, pp. 131-139, 28, Jan. 2003.
Final Office Action in U.S. Appl. No. 11/118,110, dated Nov. 30, 2010.
Response to Rule 312 Communication in U.S. Appl. No. 11/208,085, dated Apr. 15, 2010.
Request for Continued Examination, Amendment, and Petition to Withdraw from Issue in U.S. Appl. No. 11/208,085, dated May 25, 2010.
Granted Petition to Withdraw from Issue in U.S. Appl. No. 11/208,085, dated May 27, 2010.
Notice of Allowance in U.S. Appl. No. 11/208,085, dated Jul. 6, 2010.
Request for Continued Examination and Information Disclosure Statement in U.S. Appl. No. 11/208,085, dated Oct. 5, 2010.
Preliminary Amendment in U.S. Appl. No. 11/208,085, dated Oct. 8, 2010.
Notice of Allowance in U.S. Appl. No. 11/208,085, dated Oct. 29, 2010.
Official Communication in Japanese Application No. 2007-533524, dated Jun. 8, 2010.
Office Action in Chinese Application No. 200580032161, dated Dec. 3, 2010.
Application as Filed in U.S. Appl. No. 11/118,110, dated Feb. 28, 2011.
Office Action in U.S. Appl. No. 11/118,110, dated Apr. 4, 2011.
Office Action in Japanese Application No. 2005-276235 dated Apr. 5, 2011.
Application as Filed in U.S. Appl. No. 13/032,519, dated Feb. 22, 2011.
Official Communication in Japanese Application No. 2007-533541, dated Mar. 15, 2011.
Application as Filed in U.S. Appl. No. 13/025,870, dated Feb. 11, 2011.
Office Action in Russian Application No. 2007115885/28, dated Sep. 24, 2010.

* cited by examiner

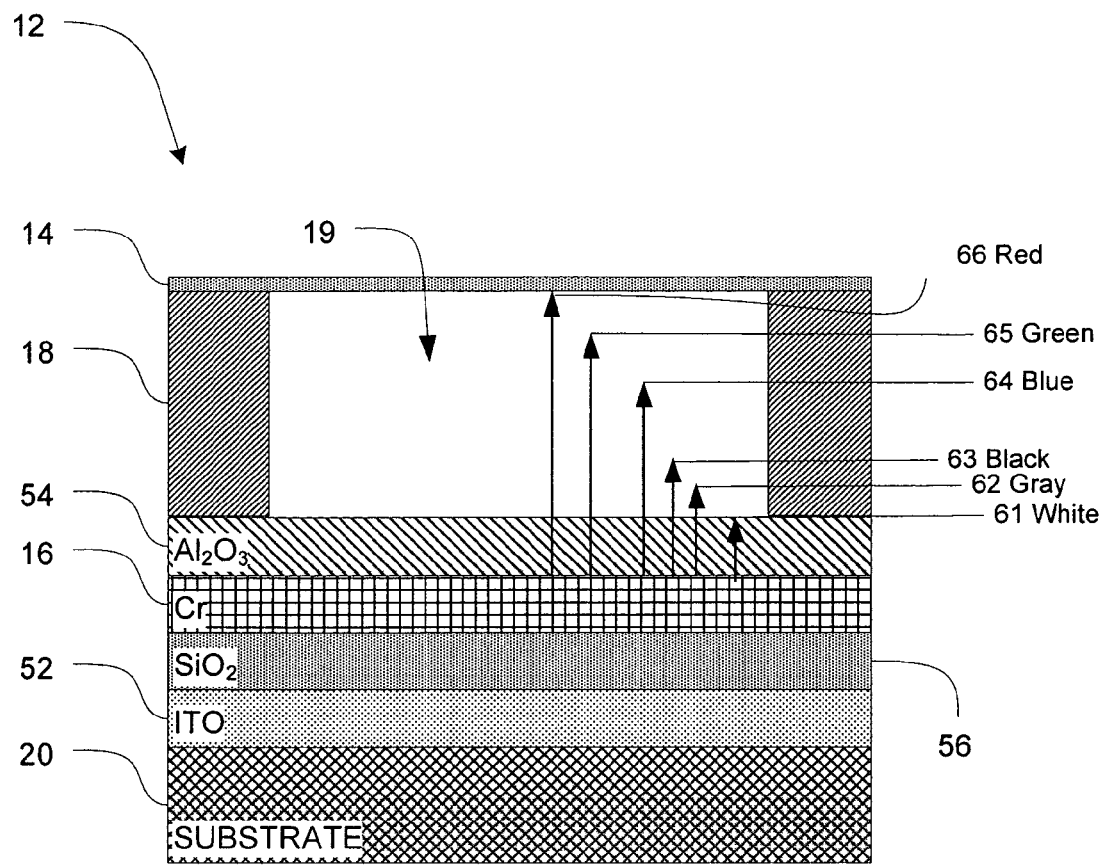
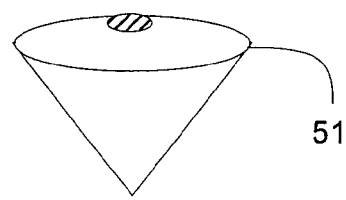
*FIG. 8*

US 8,031,133 B2

METHOD AND DEVICE FOR MANIPULATING COLOR IN A DISPLAY

RELATED APPLICATIONS

This application claims the benefit of U.S. Provisional Application No. 60/613,491 filed Sep. 27, 2004; U.S. Provisional Application No. 60/623,072 filed Oct. 28, 2004; and U.S. Provisional Application no. 60/613,535 filed Sep. 27, 2004. Each of the foregoing applications is incorporated by reference in its entirety.

FIELD

The field of the invention relates to microelectromechanical systems (MEMS).

BACKGROUND

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment includes a display. The display includes a plurality of pixels. Each of the pixels includes at least one red subpixel comprising at least one interferometric modulator configured to output red light, at least one green subpixel comprising at least one interferometric modulator configured to output green light, at least one blue subpixel comprising at least one interferometric modulator configured to output blue light, and at least one white subpixel comprising at least one interferometric modulator configured to output colored light.

Another embodiment includes a display. The display includes a plurality of interferometric modulators. The plurality of interferometric modulators includes at least one interferometric modulator configured to output red light, at least one interferometric modulator configured to output green light, at least one interferometric modulator configured to output blue light, and at least one interferometric modulator configured to output white light. The at least one interferometric modulator configured to output white light outputs white light having a standardized white point.

Another embodiment includes a display. The display includes a plurality of display elements. Each of the display elements includes a reflective surface configured to be positioned at a distance from a partially reflective surface. The plurality of display elements includes at least one of the plurality of display elements configured to output colored light and at least one of the plurality of display elements configured to interferometrically output white light.

Another embodiment includes a method of fabricating a display. The method includes forming a plurality of display elements configured to output light. Each of the plurality of display elements includes a reflective surface configured to be positioned at distance from a partially reflective surface. Each of the respective distances is selected so that at least one of the plurality of display elements is configured to output colored light and at least one other of the plurality of display elements is configured to interferometrically output white light.

Another embodiment includes a display. The display includes first means for outputting colored light and second means for interferometrically outputting white light. The first and second means include microelectromechanical systems.

Another embodiment includes a display. The display includes a plurality of pixels each comprising red, green, and blue interferometric modulators that are configured to output red, green, and blue light, respectively. Each of the pixels are configured to output a greater intensity of green light than red light and configured to output a greater intensity of green light than blue light when each of the interferometric modulators are set to output red, green, and blue light.

Another embodiment includes a method of fabricating a display. The method includes forming a plurality of pixels. Forming the plurality of pixels includes forming interferometric modulators configured to output red light, forming interferometric modulators configured to output green light, and forming interferometric modulators configured to output blue light. Each of the pixels are configured to output a greater intensity of green light than red light and configured to output a greater intensity of green light than blue light when each of the interferometric modulators are set to output red, green, and blue light.

Another embodiment includes a display. The display includes a plurality of pixels. Each of the pixels comprises red, green, and blue interferometric modulators that are configured to output red, green, and blue light, respectively. Each of the pixels are configured to output a greater intensity of green light than red light and configured to output a greater intensity of green light than blue light. At least one of the interferometric modulators configured to output red light and the interferometric modulators configured to output blue light are configured to output light having a wavelength selected to compensate for the greater intensity of green light.

BRIEF DESCRIPTION OF THE DRAWINGS

FIG. 8 is a side cross-sectional view of an exemplary interferometric modulator that illustrates the spectral characteristics of output light by positioning the movable mirror in a range of positions.

FIG. 13 is a schematic diagram illustrating two pixels of an exemplary pixel array 30. Rows 1-4 and columns 1-4 form one pixel 120a.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment is a display in which each of the pixels comprises a set of display elements, which may each comprise one or more interferometric modulators. The set of display elements includes display elements configured to output red, green, blue, and white light. In one embodiment, the "white light" display element outputs white light having a broader, higher intensity, spectral response than the combined spectral response of the "red," "green," and "blue" display elements. In one embodiment, the display includes a driver circuit configured to turn on the "white light" display element, when the data for driving the pixel. In addition, embodiments include color displays configured to provide a greater proportion of the intensity of output light in green portions of the visible spectrum in order to increase perceived brightness of the display.

Figure 1:
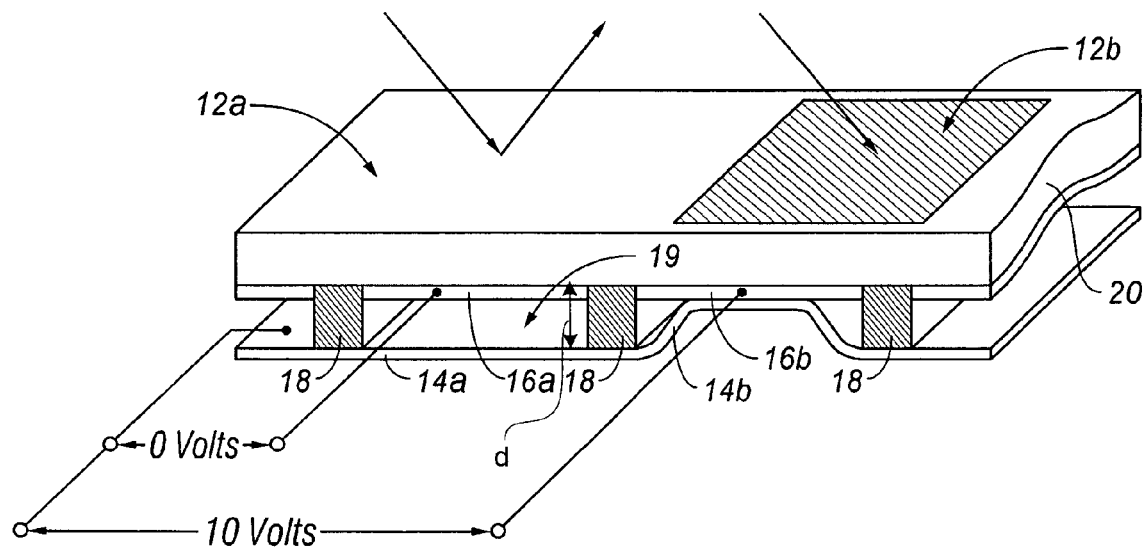
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
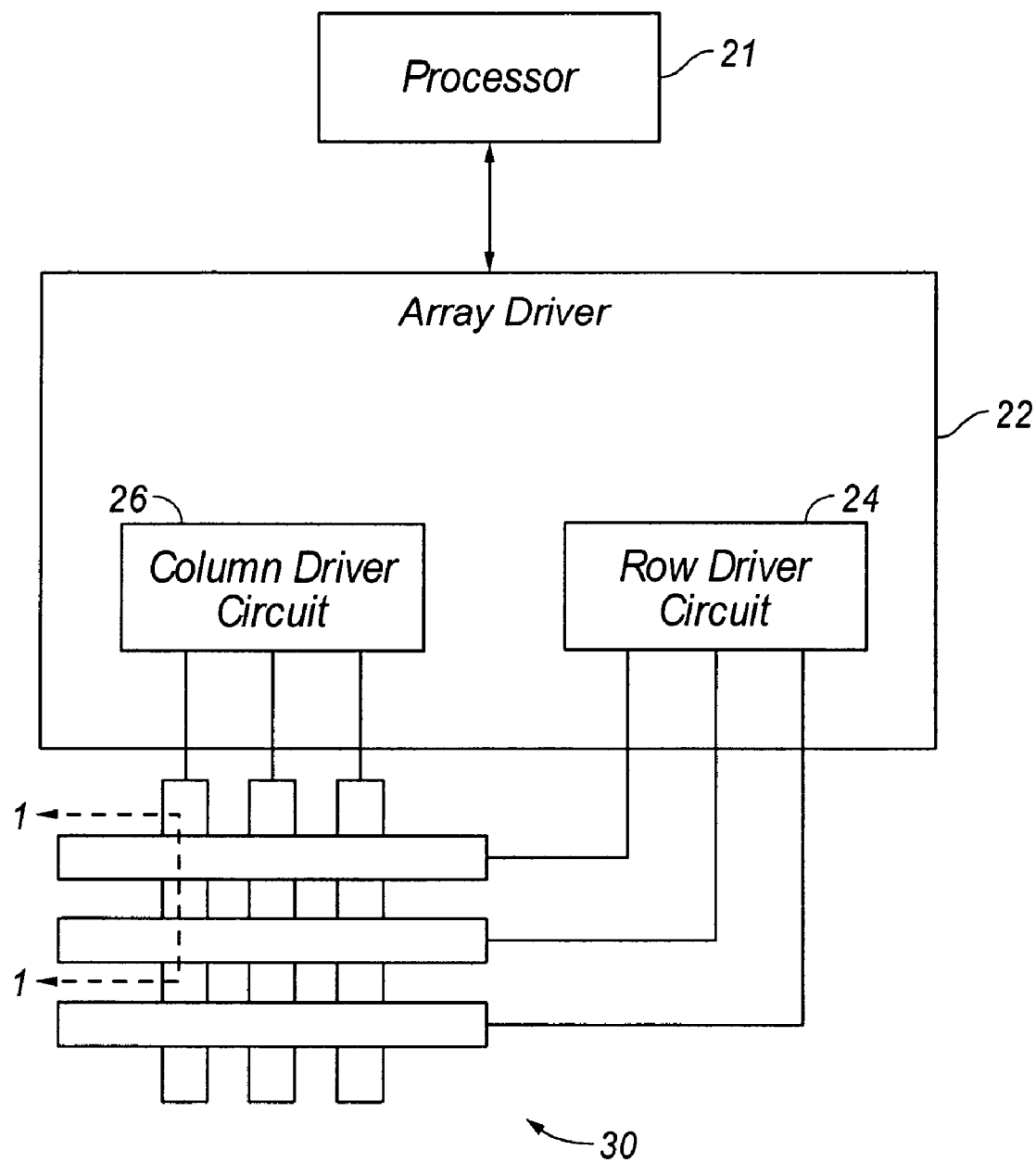
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
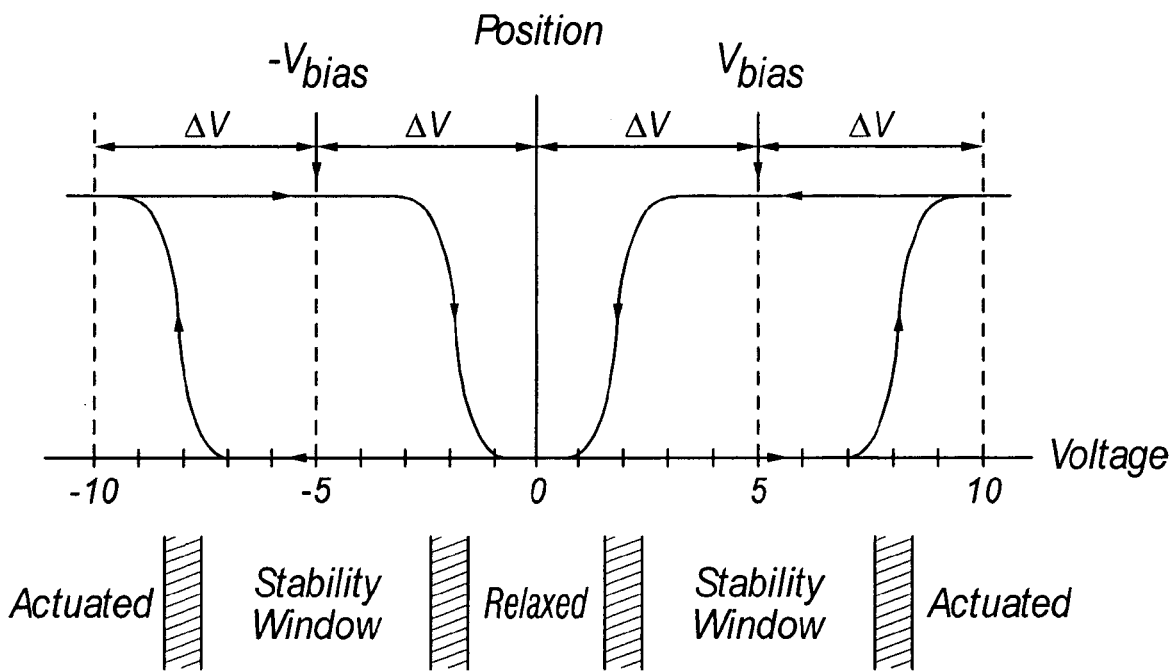
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
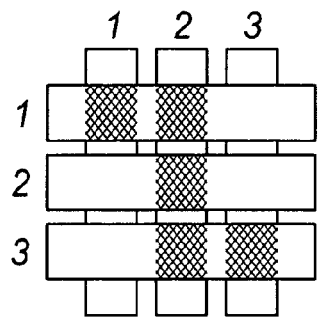
FIGS. 5A and 5B illustrate one exemplary timing diagram for row and column signals that may be used to write a frame of display data to the 3×3 interferometric modulator display of FIG. 2.
Figure 5B:
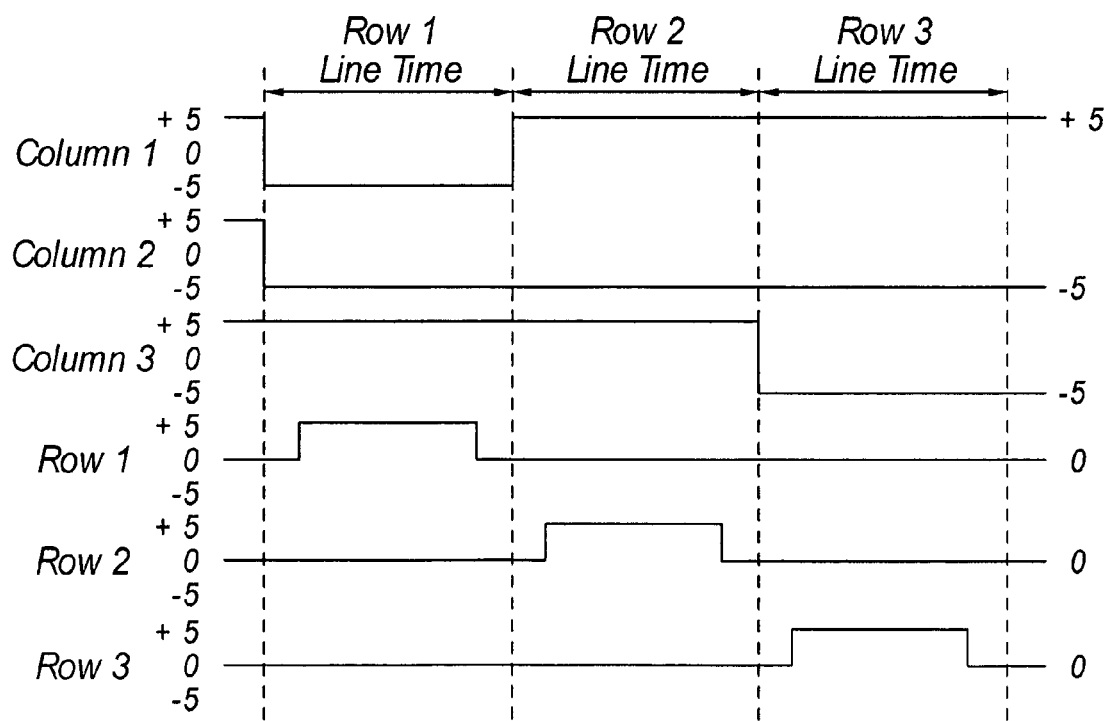

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
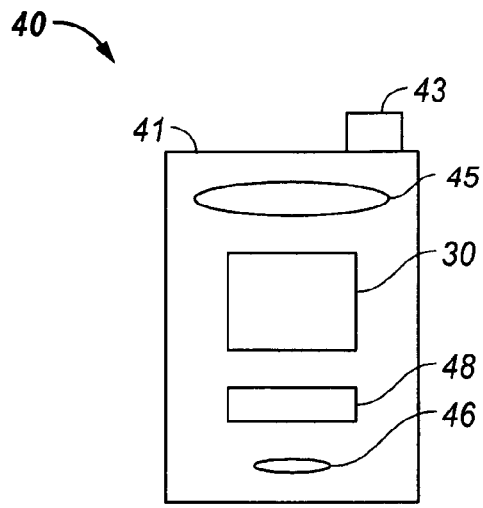
FIGS. 6A and 6B are system block diagrams illustrating an embodiment of a visual display device comprising a plurality of interferometric modulators.
Figure 6B:
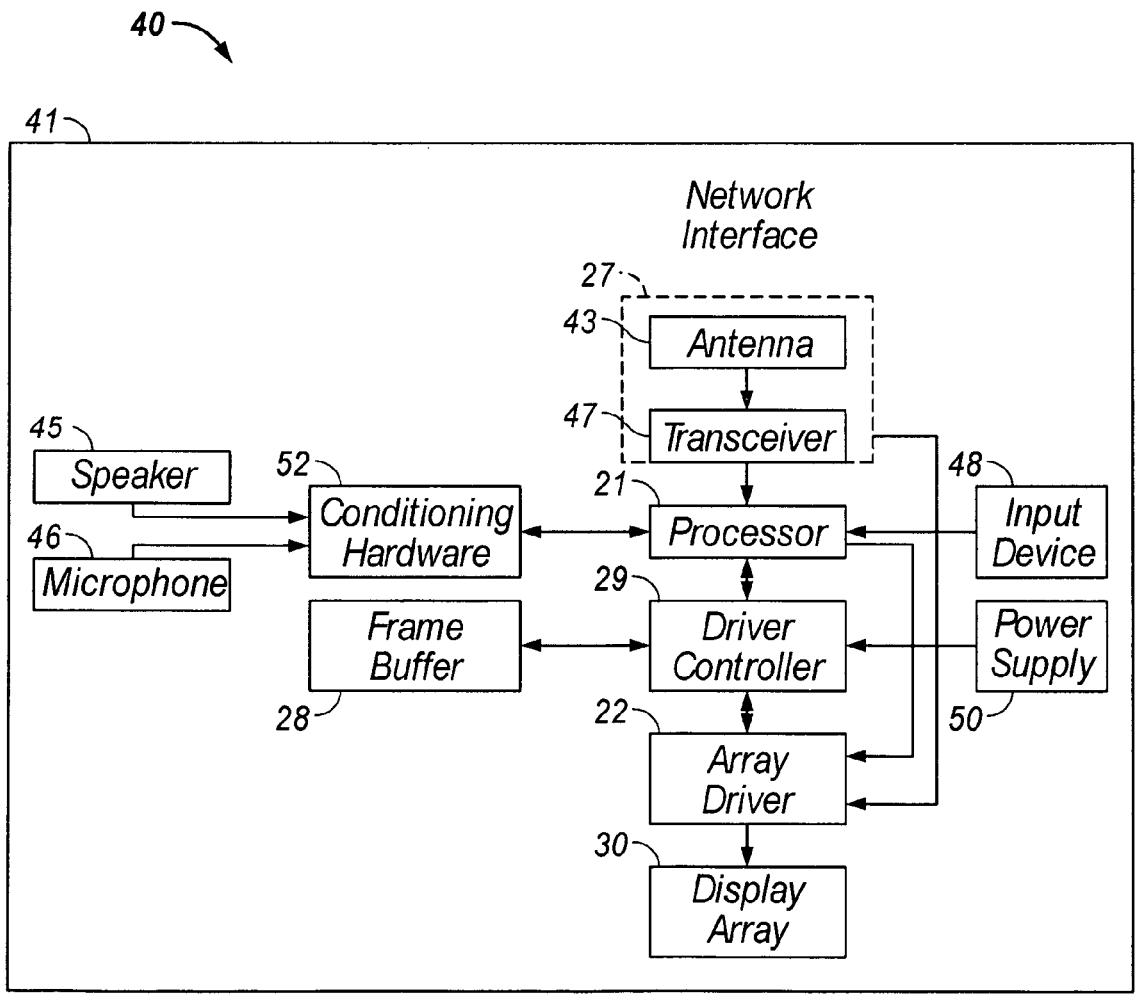

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
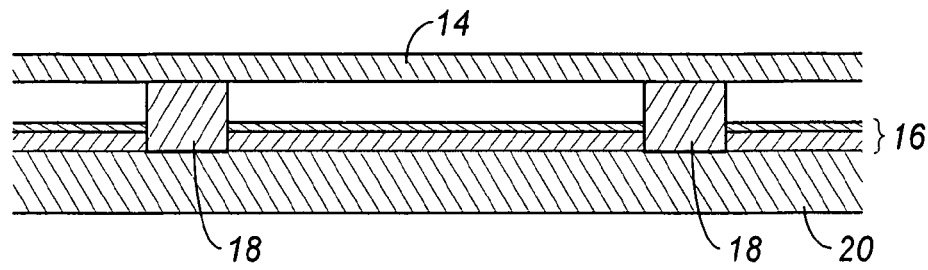
FIG. 7A is a cross section of the device of FIG. 1.
Figure 7B:
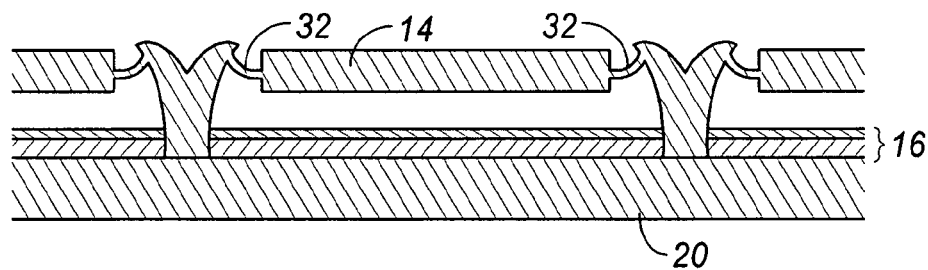
FIG. 7B is a cross section of an alternative embodiment of an interferometric modulator.
Figure 7C:
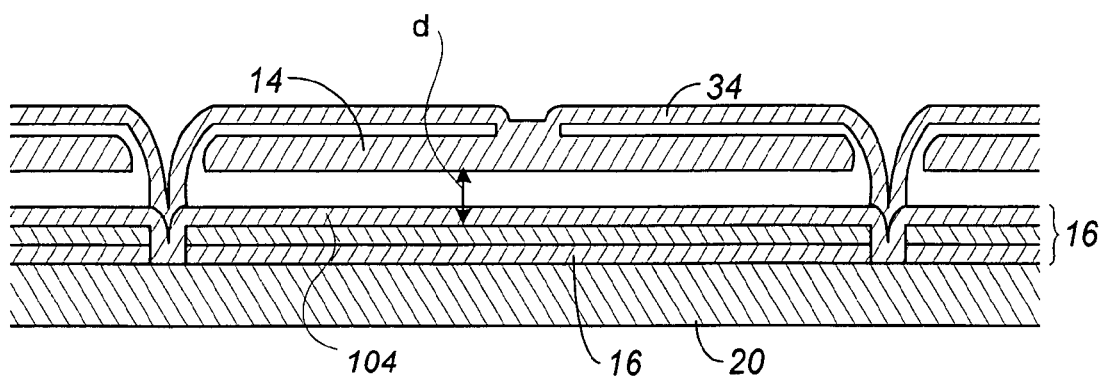
FIG. 7C is a cross section of another alternative embodiment of an interferometric modulator.
Figure 7D:
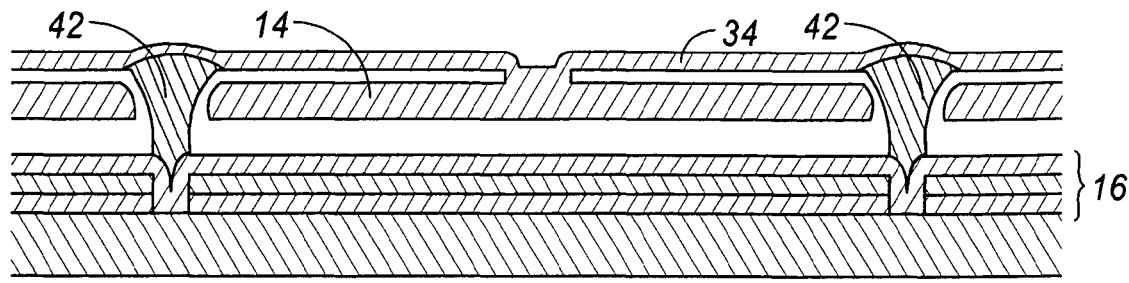
FIG. 7D is a cross section of yet another alternative embodiment of an interferometric modulator.
Figure 7E:
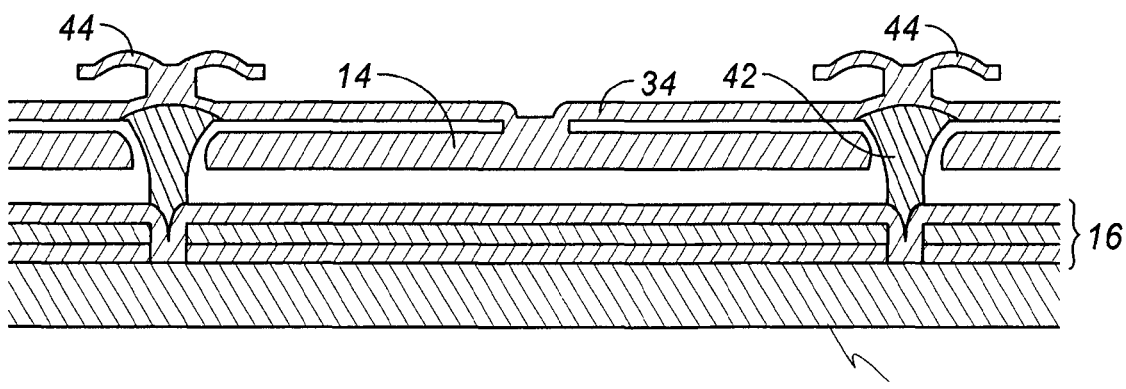
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above with reference to FIG. 1, the modulator 12 (i.e., both modulators 12a and 12b) includes an optical cavity formed between the mirrors 14 (i.e., mirrors 14a and 14b) and 16 (mirrors 16a and 16b, respectively). The characteristic distance, or effective optical path length, d, of the optical cavity determines the resonant wavelengths, $\lambda$, of the optical cavity and thus of the interferometric modulator 12. A peak resonant visible wavelength, $\lambda$, of the interferometric modulator 12 generally corresponds to the perceived color of light reflected by the modulator 12. Mathematically, the optical path length d is equal to ½ N $\lambda$, where N is an integer. A given resonant wavelength, $\lambda$, is thus reflected by interferometric modulators 12 having optical path lengths d of ½ $\lambda$(N=1), $\lambda$ (N=2), 3/2 $\lambda$ (N=3), etc. The integer N may be referred to as the order of interference of the reflected light. As used herein, the order of a modulator 12 also refers to the order N of light reflected by the modulator 12 when the mirror 14 is in at least one position. For example, a first order red interferometric modulator 12 may have an optical path length d of about 325 nm, corresponding to a wavelength $\lambda$ of about 650 nm. Accordingly, a second order red interferometric modulator 12 may have an optical path length d of about 650 nm. Generally, higher order modulators 12 reflect light over a narrower range of wavelengths, e.g., have a higher "Q" value, and thus produce colored light that is more saturated. The saturation of the modulators 12 that comprise a color pixel affects properties of a display such as the color gamut and white point of the display. For example, in order for a display using a second order modulator 12 to have the same white point or color balance as a display that includes a first order modulator reflecting the same general color of light, the second order modulator 12 may be selected to have a different central peak optical wavelength.

FIG. 8 is a side cross-sectional view of an exemplary interferometric modulator 12 that illustrates the spectral characteristics of light that would be output by positioning the movable mirror 14 at a range of positions 61-65. The exemplary modulator includes a conductive layer 52 of indium-tin-oxide (ITO) acting as a column electrode. In the exemplary modulator, the movable mirror 14 includes the row conductor.

Each of a particular group of positions 61-65 of the movable mirror 14 is shown by an arrow extending from the fixed mirror 16. The point of each arrow indicates a particular one of the positions 61-65 of the movable mirror. The color of light reflected from the interferometric modulator is determined by the optical path length, d, between the movable and fixed mirrors 14 and 16. The distances 61-65 are selected so as to account for the thickness and index of refraction of the dielectric layer 54 in the optical path length, d. Accordingly, a movable mirror 14 positioned at a different one of the positions 61-65, each corresponding to a different distance, d, would result in a modulator 12 that outputs light to a viewing position 51 with a different spectral response, which corresponds to different colors of incident light being reflected by the modulator 12. Moreover, at position 61, the movable mirror 14 is sufficiently close to the fixed mirror 16, that the effects of interference are negligible and modulator 12 acts as a mirror that reflects substantially all colors of incident visible light substantially equally, e.g., as white light. The broadband mirror effect is caused because the small distance d is too small for optical resonance in the visible band. The mirror 14 thus merely acts as a reflective surface with respect to visible light.

With the mirror 14 positioned at the position 62, the modulator 12 exhibits a shade of gray as the increased gap distance between the mirrors 14 and 16 reduces the reflectivity of the mirror 14. At the position 63, the distance d is such that the cavity operates interferometrically but reflects substantially no visible wavelengths of light because the resonant wavelength is outside the visible range.

As the distance d is increased further, a peak spectral response of the modulator 12 moves into visible wavelengths. Thus, when the movable mirror 14 is at position 64, the modulator 12 reflects blue light. When the movable mirror 14 is at the position 65, the modulator 12 reflects green light. When the movable mirror 14 is at the non-deflected position 66, the modulator 12 reflects red light.

In designing a display using interferometric modulators 12, the modulators 12 may be formed so as to increase the color saturation of reflected light. Saturation refers to the intensity of the hue of color light. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color. In one embodiment, the modulator 12 is formed with a distance d corresponding to higher order of interference, e.g., 2nd or 3rd order, to increase the saturation of reflected color light.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. In general, the more saturated the primary colors, the greater the range of colors that can be produced by the display. In other embodiments, the display may include modulators 12 having sets of colors that define other color systems in terms of sets of primary colors other than red, green, and blue.

Another consideration in the design of displays incorporating interferometric modulators 12 is the generation of white light. "White" light generally refers to light that is perceived by the human eye to include no particular color, i.e., white light is not associated with a hue. While black refers to an absence of color (or light), white refers to light that includes such a broad spectral range that no particular color is perceived. White light may refer to light having a broad spectral range of visible light at approximately uniform intensity. However, because the human eye is sensitive to certain wavelengths of red, green, and blue light, white can be created by mixing intensities of colored light to produce light that has one or more spectral peaks which is perceived by the eye as "white." The color gamut of a display is the range of colors that the device is able to reproduce, e.g., by mixing red, green, and blue light.

In a reflective display, white light produced using saturated interferometric modulators tends to have a relatively low intensity to a viewer because only a small range of incident wavelengths is reflected with relatively high intensities to form the white light. In contrast, a mirror reflecting broadband white light, e.g., substantially all incident wavelengths, has a greater intensity because a greater range of incident wavelengths is reflected. Thus, designing reflective displays using combinations of primary colors to produce white light generally results in a tradeoff between color saturation and color gamut and the brightness of white light output by the display.

In one embodiment, the movable mirror 14 is positioned so that in a first position the modulator 12 is non-reflective of visible light (e.g., position 63 of FIG. 8) and in a second position the distance between the movable mirror 14 and the fixed mirror 16 is too small for interferometric modulation of the incident visible light so that the mirror 14 reflects a broadband white (e.g., position 61 of FIG. 8). In such an embodiment, the movable mirror 14 reflects incident light with a broad, relatively uniform spectral response across the visible spectrum. If the incident light comprises white light, the light reflected by the modulator 12 in the second position may be a substantially similar white light. The spectral response of such a "white" reflective state of the modulator 12 may be generally uniform across the visible spectrum. In one embodiment, the spectral response is tuned by selection of the materials of the modulator. For example, different materials, e.g., aluminum or copper, may be used for the reflective surface of the movable mirror 14 so as to tune the spectral response of the modulator 12 when in the white reflective state. In another embodiment, a filter may be used to selectively absorb certain wavelengths of reflected or incident light to affect the output of such a broadband white modulator.

In one embodiment of the pixel array 30, each pixel includes one or more color modulators 12, e.g., modulators configured to reflect red, green, and blue light, and one or more "white" modulators 12 configured to reflect white light. In such an embodiment, light from the red, green, and/or blue modulators 12 in their reflective states combines to output colored light. Light from the white modulators 12 can be used to output white or gray light. Use of white in combination with color may increase the brightness or intensity of the pixels.

The white point of a display is the hue that is considered to be generally neutral (gray or achromatic). The white point of a display device may be characterized based on a comparison of white light produced by the device with the spectral content of light emitted by a black body at a particular temperature ("black body radiation"). A black body radiator is an idealized object that absorbs all light incident upon the object and which reemits the light with a spectrum dependent on the temperature of the black body. For example, the black body spectrum at 6,500° K may be referred to as white light having a color temperature of 6,500° K. Such color temperatures, or white points of approximately 5,000°-10,000° K are generally identified with daylight.

The International Commission on Illumination (CIE) promulgates standardized white points of light sources. For example, light source designations of "d" refer to daylight. In particular, standard white points $D_{55}$, $D_{65}$, and $D_{75}$, which correlate with color temperatures of 5,500° K, 6,500° K, and 7,500° K, are standard daylight white points.

A display device may be characterized by the white point of the white light produced by a display. As with light from other light sources, human perception of a display is at least partially determined by the perception of white light from the display. For example, a display or light source having a lower white point, e.g., D55, may be perceived as having a yellow tone by a viewer. A display having a higher temperature white point, e.g., D75 may be perceived as having a "cooler" or bluer tone to a user. Users generally respond more favorably to displays having higher temperature white points. Thus, controlling the white point of a display desirably provides some control over a viewer's response to a display. Embodiments of the interferometric modulator array 30 may be configured to produce white light in which the white point is selected to conform to a standardized white point under one or more anticipated lighting conditions.

White light can be produced by the pixel array 30 by including one or more interferometric modulators 12 for each pixel. For example, in one embodiment, the pixel array 30 includes pixels of groups of red, green, and blue interferometric modulators 12. As discussed above, the colors of the interferometric modulators 12 may be selected by selecting the optical path length d using the relation of $d=\frac{1}{2} N \lambda$. In addition, the balance, or relative proportions, of the colors produced by each pixel in the pixel array 30 may be further affected by the relative reflective areas of each of the interferometric modulators 12, e.g., of the red, green, and blue interferometric modulators 12. Further, because the modulators 12 selectively reflect incident light, the white point of reflected light from the pixel array 30 of interferometric modulators 12 is generally dependent on the spectral characteristics of incident light. In one embodiment, the white point of reflected light may be configured to be different than the white point of incident light. For example, in one embodiment, the pixel array 30 may be configured to reflect D75 light when used in D65 sunlight.

In one embodiment, the distances d and areas of the interferometric modulators 12 in the pixel array 30 are selected so that white light produced by the pixel array 30 corresponds to a particular standardized white point in an anticipated lighting condition, e.g., in sunlight, under fluorescent light, or from a front light positioned to illuminate the pixel array 30. For example, the white point of the pixel array 30 may be selected to be $D_{55}$, $D_{65}$, or $D_{75}$ in particular lighting conditions. Moreover, the light reflected by the pixel array 30 may have a different white point than the light of an anticipated or configured light source. For example, a particular pixel array 30 may be configured to reflect D75 light when viewed under D65 sunlight. More generally, the white point of a display may be selected with reference to a source of illumination configured with the display, e.g., a front light, or with reference to a particular viewing condition. For example, a display may be configured to have a selected white point, e.g., D55, D65, or D75, when viewed under anticipated or typical sources of illumination such as incandescent, fluorescent, or natural light sources. More particularly, a display for use in a handheld device, for example, may be configured to have a selected white point when viewed under sunlight conditions. Alternatively, a display for use in an office environment may be configured to have a selected white point, e.g., D75, when illuminated by typical office fluorescent lights. In various embodiments, different distances d and areas of modulators 12 may be selected to produce other standardized white point settings for different viewing environments. Further, the red, green, and blue modulators 12 may also be controlled so as to be in reflective or non-reflective states for different amounts of time so as to further vary the relative balance of reflected red, green, and blue light, and thus the white point of reflected light. In one embodiment, the ratio of reflective areas of each of the color modulators 12 may be selected so as to control the white point in different viewing environments. In one embodiment, the optical path length d may be selected so as to correspond to a common multiple of more than one visible resonant wavelength, e.g., first, second, or third order peaks of red, green, and blue, so that the interferometric modulator 12 reflects white light characterized by three visible peaks in its spectral response. In such an embodiment, the optical-path length d may be selected so that the white light produced corresponds to a standardized white point.

In addition to groups of red, green, and blue interferometric modulators 12 in the pixel array 30, other embodiments include other ways of generating white light. For example, one embodiment of the pixel array 30 includes cyan and yellow interferometric modulators 12, e.g., interferometric modulators 12 that have respective separation distances d so as to produce cyan and yellow light. The combined spectral response of the cyan and yellow interferometric modulators 12 produces light with a broad spectral response that is perceived as "white." The cyan and yellow modulators are positioned proximately so that a viewer perceives such a combined response. For example, in one embodiment, the cyan modulators and yellow modulators are arranged in adjacent rows of the pixel array 30. In another embodiment, the cyan modulators and yellow modulators are arranged in adjacent columns of the pixel array 30.

Figure 9:
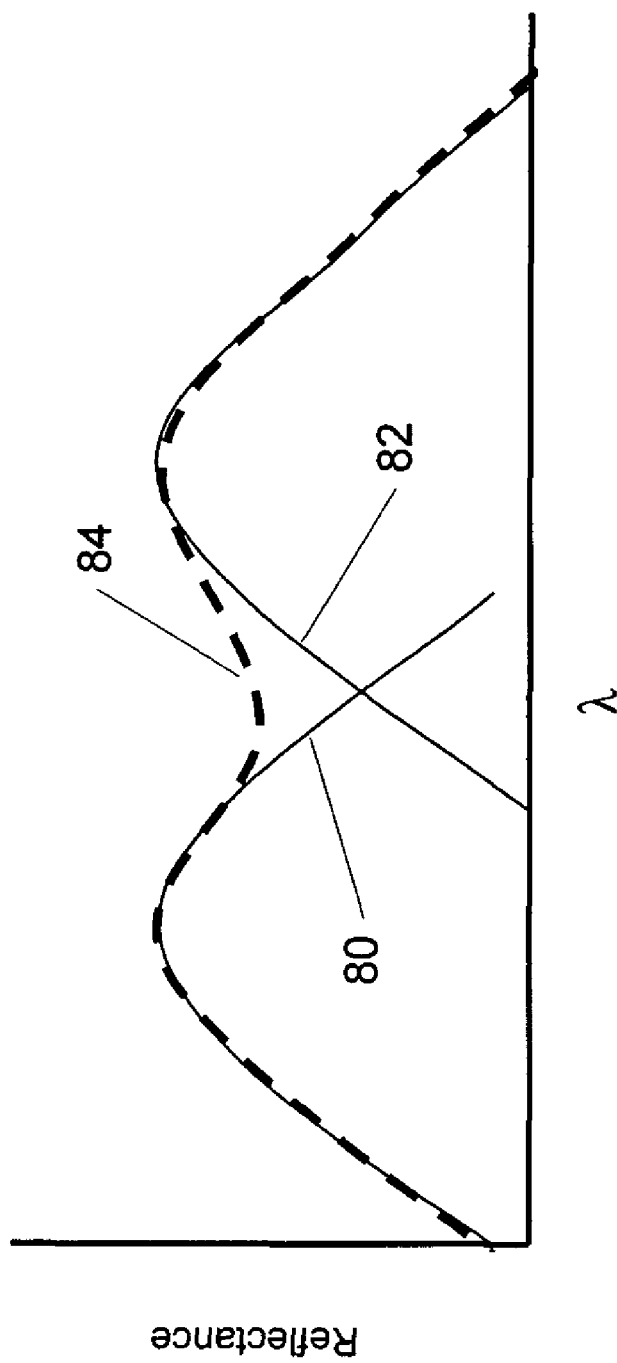
FIG. 9 is a graphical diagram illustrating the spectral response of one embodiment that includes cyan and yellow interferometric modulators to produce white light.

FIG. 9 is a graphical diagram illustrating the spectral response of one embodiment that includes cyan and yellow interferometric modulators 12 to produce white light. The horizontal axis represents the wavelength of reflected light. The vertical axis represents the relative reflectance of light incident on the modulators 12. A trace 80 illustrates the response of the cyan modulator, which is a single peak centered in the cyan portion of the spectrum, e.g., between blue and green. A trace 82 illustrates the response of the yellow modulator, which is a single peak centered in the yellow portion of the spectrum, e.g., between red and green. A trace 84 illustrates the combined spectral response of a pair of cyan and yellow modulators 12. The trace 84 has two peaks at cyan and yellow wavelengths but is sufficiently uniform across the visible spectrum so that reflected light from such modulators 12 is perceived as white.

Figure 10:
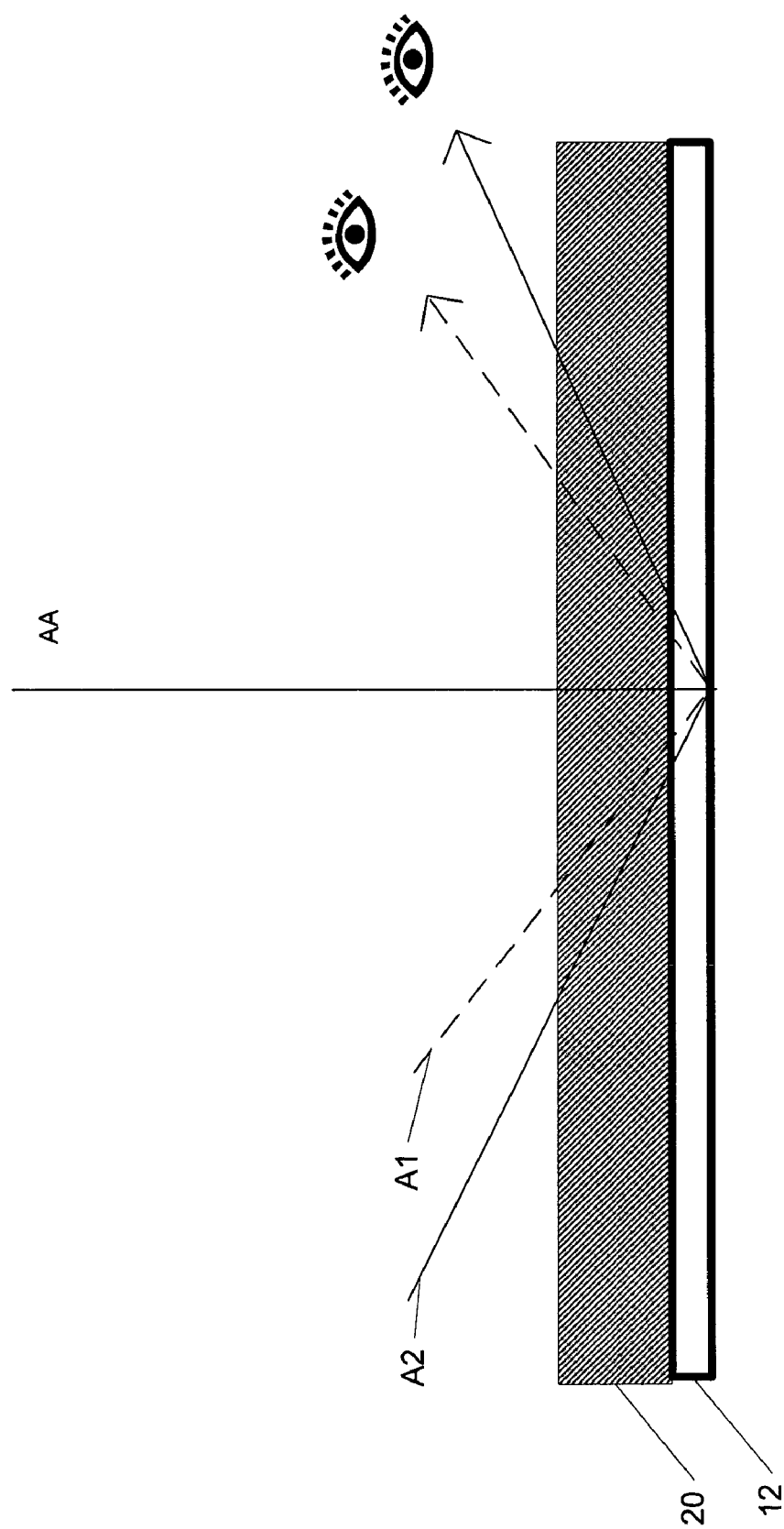
FIG. 10 is a side cross-sectional view of an interferometric modulator illustrating different optical paths through the modulator that result in different color light being reflected.

Generally, the color of light reflected by an interferometric modulator 12 shifts when the modulator 12 is viewed from different angles. FIG. 10 is a side cross-sectional view of an interferometric modulator 12 illustrating different optical paths through the modulator 12. The color of light reflected from the interferometric modulator 12 may vary for different angles of incidence (and reflection) with respect to an axis AA as illustrated in FIG. 10. For example, for the interferometric modulator 12 shown in FIG. 10, as light travels along the off-axis path $A_1$, the light is incident on the interferometric modulator at a first angle, reflects from the interferometric modulator, and travels to a viewer. The viewer perceives a first color when the light reaches the viewer as a result of optical interference between a pair of mirrors in the interferometric modulator 12. When the viewer moves or changes his/her location and thus view angle, the light received by the viewer travels along a different off-axis path $A_2$ corresponding to a second different angle of incidence (and reflection). Optical interference in the interferometric modulator 12 depends on optical path length of light propagated within the modulator, d. Different optical path lengths for the different optical paths $A_1$ and $A_2$ therefore yield different outputs from the interferometric modulator 12. With increasing view angle, the effective optical path of the interferometric modulator is decreased according to the relationship $2d \cos \beta = N\lambda$, where $\beta$ is the view angle (the angle between the normal to the display and the incident light). With increasing view angle, the peak resonant wavelength of the reflected light is decreased. The user therefore perceives different colors depending on his or her angle of view. As described above, this phenomenon is referred to as a "color shift." This color shift is typically identified with reference to a color produced by an interferometric modulator 12 when viewed along the axis AA.

In one embodiment, the pixel array 30 includes a first order yellow interferometric modulator and a second order cyan interferometric modulator. When such a pixel array 30 is viewed from increasingly larger off-axis angles, light reflected by the first order yellow modulator is shifted toward the blue end of the spectrum, e.g., the modulator at a certain angle has an effective d equal to that of a first order cyan. Concurrently, light reflected by the second order cyan modulator shifts to correspond to light from the first order yellow modulator. Thus, the overall combined spectral response is broad and relatively uniform across the visible spectrum even as the relative peaks of the spectrum shift. Such pixel array 30 thus produces white light over a relatively large range of viewing angles.

In one embodiment, a display having a cyan and yellow modulators may be configured to produce white light having a selected standardized white point under one or more viewing conditions. For example, the spectral response of the cyan modulator and of the yellow modulator may be selected so that reflected light has a white point of D55, D65, D75, or any other suitable white point under selected illumination conditions that include D55, D65, or D75 light such as sunlight for a display suited for outdoor use. In one embodiment, the modulators may be configured to reflect light that has a different white point than incident light from an expected or selected viewing condition.

Figure 11:
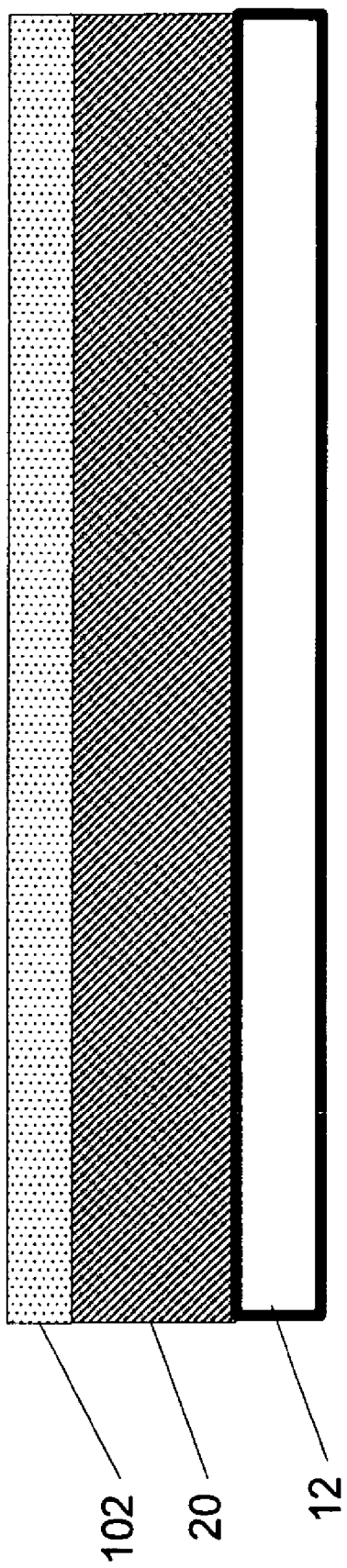
FIG. 11 is a side cross-sectional view of the interferometric modulator having a layer of material for selectively transmitting light of a particular color.

FIG. 11 is a side cross-sectional view of the interferometric modulator 12 having a layer 102 of material for selectively transmitting light of a particular color. In an exemplary embodiment, the layer 102 is on the opposite side of the substrate 20 from modulator 12. In one embodiment, the layer 102 of material comprises a magenta filter through which green interferometric modulators. 12 are viewed. In one embodiment, the layer 102 of material is a dyed material. In one such embodiment, the material is a dyed photoresist material. In one embodiment, the green interferometric modulators 12 are first order green interferometric modulators. The filter layer 102 is configured to transmit magenta light when illuminated with a broadly uniform white light. In the exemplary embodiment, light is incident on the layer 20 from which filtered light is transmitted to the modulator 12. The modulator 12 reflects the filtered light back through the layer 102. In such an embodiment, the light passes through the layer 102 twice. In such an embodiment, the thickness of the layer 102 of material may be selected to compensate for, and utilize, this double filtering. In another embodiment, a front light structure may be positioned between the layer 102 and the modulator 12. In such an embodiment, the layer 102 of material acts only on light reflected by the modulator 12. In such embodiments, the layer 102 is selected accordingly.

Figure 12:
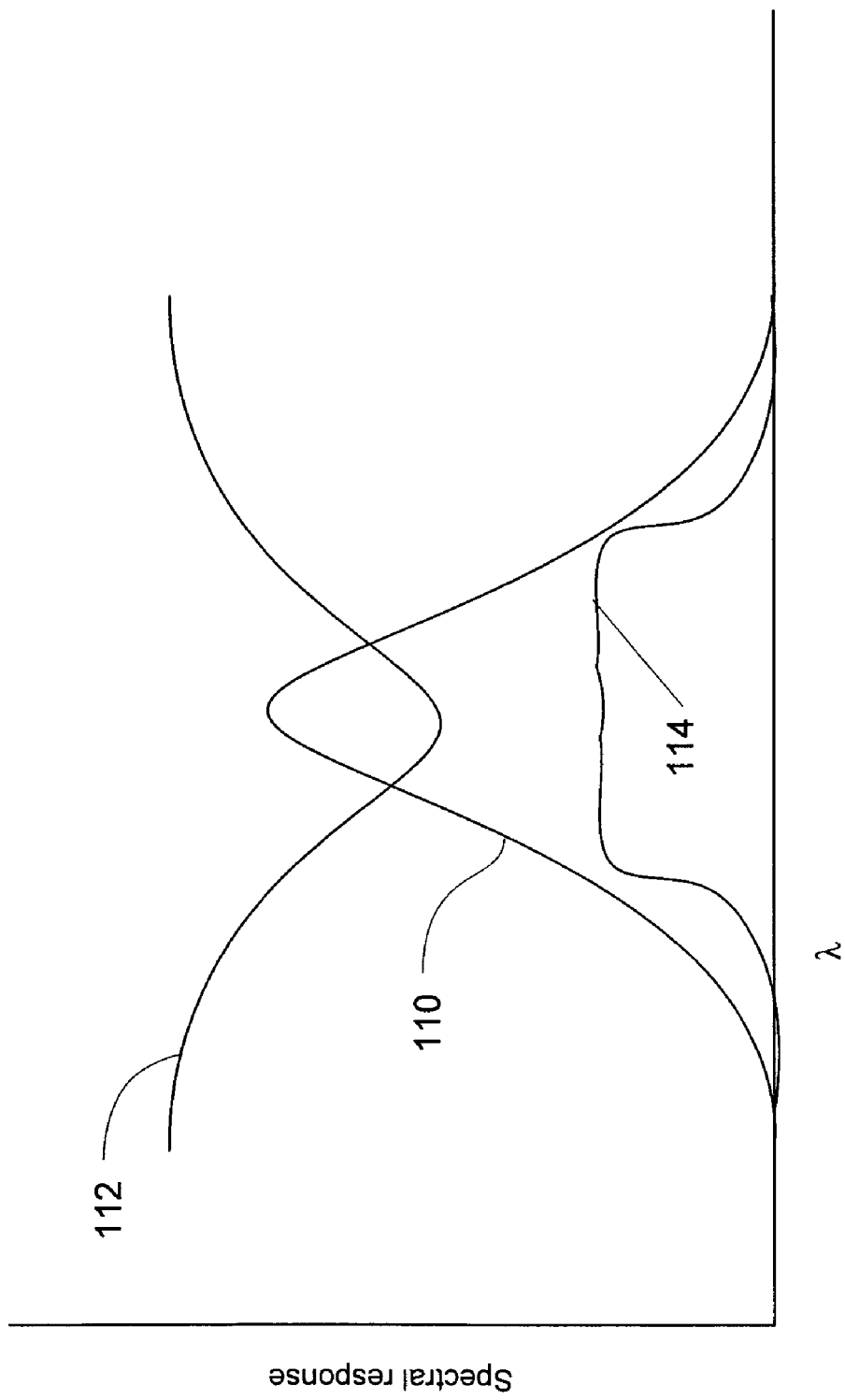
FIG. 12 is a graphical diagram illustrating the spectral response of one embodiment that includes green interferometric modulators and a "magenta" filter layer to produce white light.

FIG. 12 is a graphical diagram illustrating the spectral response of one embodiment that includes the green interferometric modulators 12 and the "magenta" filter layer 102. The horizontal axis represents the wavelength of reflected light. The vertical axis represents the relative spectral response of light incident on the green modulator 12 and filter layer 102 over the visible spectrum. A trace 110 illustrates the response of the green modulator 12, which is a single peak centered in the green portion of the spectrum, e.g., near the center of the visible spectrum. A trace 112 illustrates the response of the magenta filter formed by the layer of material 102. The trace 112 has two relatively flat portions on either side of a central u-shaped minimum. The trace 112 thus represents the response of a magenta filter that selectively transmits substantially all red and blue light while filtering light in the green portion of the spectrum. A trace 114 illustrates the combined spectral response of the pairing of the green modulator 12 and the filter layer 102. The trace 114 illustrates that the spectral response of the combination is at a lower reflectance level than the green modulator 12 due to the filtering of light by the filter layer 102. However, the spectral response is relatively uniform across the visible spectrum so that the filtered, reflected light from the green modulator 12 and the magenta filter layer 102 is perceived as white.

In one embodiment, a display having a green modulator 12 with the magenta filter layer 102 may be configured to produce white light having a selected standardized white point under one or more viewing conditions. For example, the spectral response of the green modulator 12 and of the magenta filter layer 102 may be selected so that reflected light has a white point of D55, D65, D75, or any other suitable white point under selected illumination conditions that include D55, D65, or D75 light such as sunlight for a display suited for outdoor use. In one embodiment, the modulator 12 and filter layer 102 may be configured to reflect light that has a different white point than incident light from an expected or selected viewing condition.

Figure 13:
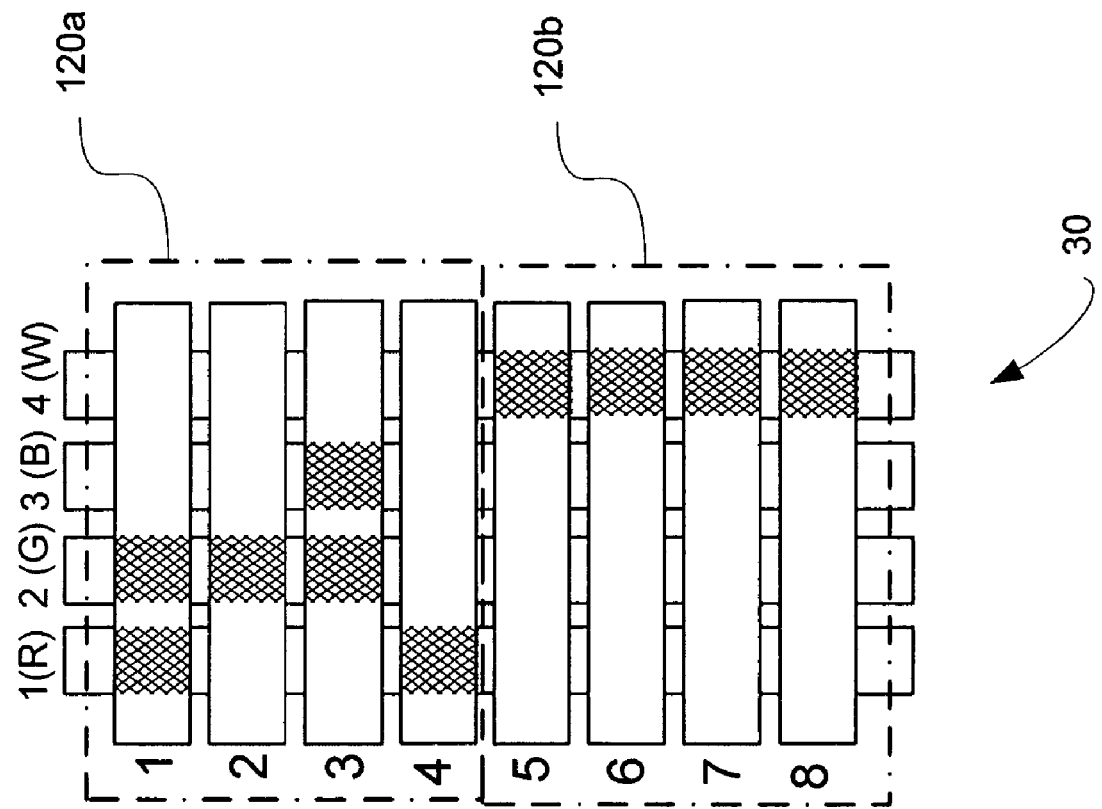

FIG. 13 is a schematic diagram illustrating two pixels of an exemplary pixel array 30. Rows 1-4 and columns 1-4 form one pixel 120a. Rows 5-8 and columns 1-4 form a second pixel 120b. Each pixel 120a and 120b includes at least one modulator 12 configured to reflect red (column 1), green, (column 2), blue (column 3), and white (column 4) light. Each pixel of the exemplary pixel array 30 includes 4 display elements of each of red, green, blue, and white to form a "4 bit" per color display which can output $2^4=16$ shades of each of red, green, blue, or white/gray for a total of $2^{16}$ shades of color.

Figure 14A:
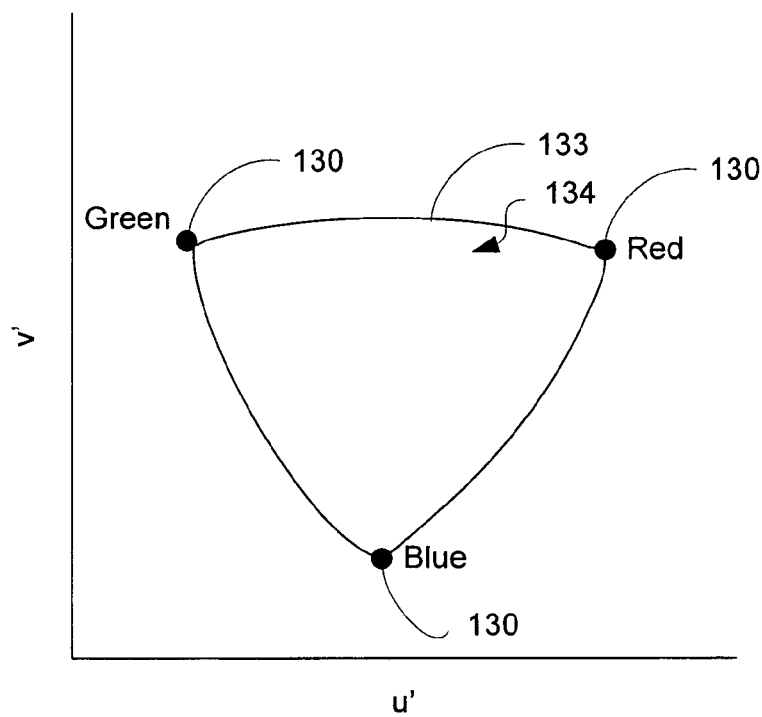
FIG. 14A is a chromaticity diagram that illustrates the colors that can be produced by an exemplary color display that includes red, green, and blue display elements.

FIG. 14A is a chromaticity diagram that illustrates the colors that can be produced by an exemplary color display that includes red, green, and blue display elements. A wide range of colors are produced in such a display by varying the relative intensity of light produced by the red, green, and blue elements. A chromaticity diagram illustrates how a display may be controlled to generate the mixtures of primary colors such as red, green, and blue that are perceived by the human eye as other colors. The horizontal and vertical axes of FIG. 14 define a chromaticity coordinate system on which color values may be depicted. In particular, points 130 illustrate the color of light reflected by exemplary red, green, and blue interferometric modulators. The triangular trace 133 encloses a region 134 that corresponds to the range of colors that can be produced by mixing the light produced at points 120. This range of colors may be referred to as the color gamut of the display. In operation, each of the red, green and blue display elements in a pixel can be controlled to produce different mixtures of the red, green, and blue light that combine to form each color within the color gamut.

As illustrated in FIG. 13, in one embodiment, an exemplary display 30 includes pixels having subpixels of red, green, blue, and white. One embodiment of a scheme for driving such a display defines each color to be displayed by a pixel in terms of combinations of (i) red, green, and white, (ii) red, blue, and white, and (iii) blue, green, and white chromaticity values that define three different color gamuts. In operation of such an embodiment, when the display controller determines that a particular pixel is to be set to a color value expressed in terms of red, green, and blue, the display controller translates the color value into a value expressed in terms of one of (i) red, green, and white; (ii) red, blue, and white, and (iii) blue, green, and white.

Figure 14B:
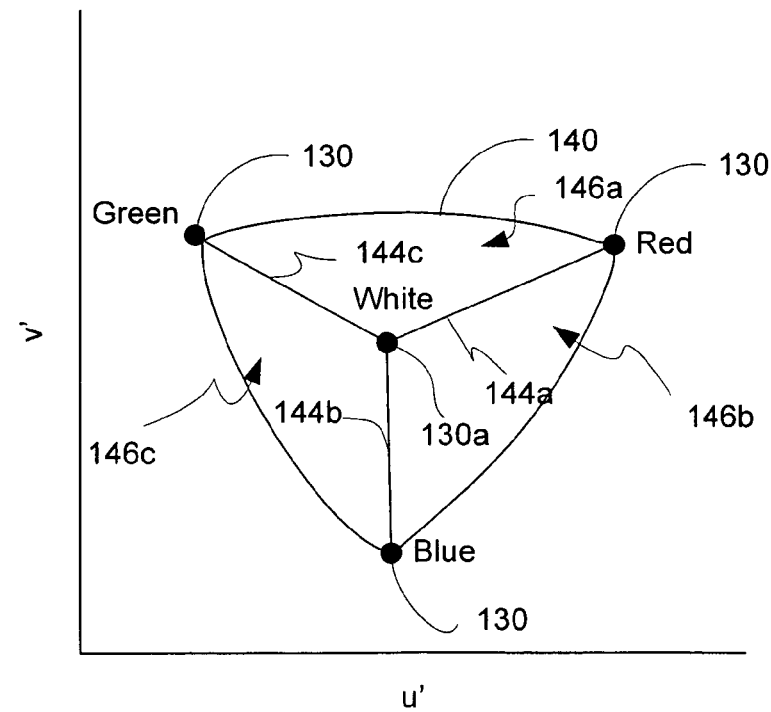
FIG. 14B is a chromaticity diagram that illustrates the colors that can be produced by an exemplary color display that includes red, green, blue, and white display elements.

FIG. 14B is a chromaticity diagram that illustrates the colors that can be produced by such a color display. The overall color gamut of the display is defined by the area defined by a trace 140 that connects each of the points 130 corresponding to the chromaticity of the display primary colors red, green, and blue. In addition, a point 130a corresponds to the chromaticity of light emitted by the white subpixel. This point 130a may be in other locations depending on the white produced by the white subpixel. Traces 144a, 144b, and 144c connect the point 130a corresponding to the white subpixel to each of the points 130 corresponding to red, blue, and green, respectively. Along with the trace 140, the traces 144a, 144b, and 144c define three regions 146a, 146b, and 146c within the color gamut of the display corresponding to the colors that may be produced by the (i) red, green, and white, (ii) red, blue, and white, and (iii) blue, green, and white display elements, respectively. Thus, conceptually, one embodiment of a drive scheme for such a display includes identifying within which of the three regions 146a, 146b, or 146c a desired color to be displayed falls. The input color, represented as values of red, green, and blue may then be converted to a new chromaticity . This chromaticity coordinate will fall within one of the three identified regions 146a, 146b, or 146c. New output values may then be used to drive each of the three identified display elements bounding the region within which the desired chromaticity coordinate falls, (i) red, green, and white, (ii) red, blue, and white, or (iii) blue, green, and white display elements, of the pixel to output the desired color of light.

In one embodiment, when a chromaticity value is within a selected distance (e.g., on the chromaticity diagram) of the point 130a of the white display element, both the color and the white display elements are activated so as to produce a brighter output from the pixel for such colors.

In another embodiment, in order to drive such a pixel array, when the total hue of the pixel data is below a threshold value, e.g., the pixel data is a gray or substantially gray color, a driver circuit sets the white modulators in column 4 to a corresponding reflective state. In one embodiment, the red, green, and blue modulators may also be in their reflective states. When the total hue for the pixel data is above a threshold value, e.g., the pixel data is not substantially gray, the driver circuit sets the white modulators in column 4 to their non-reflective state and the color modulators in columns 1-3 are set to reflective states.

In certain embodiments, white display elements may be activated in combination with color display elements to add additional brightness. For example, if a pixel is to output red light, all of the red display elements in the pixel may be activated. Additionally, one or more of the white display elements may also be activated to produce other color combinations.

In certain embodiments, a driver circuit can adjust input data to compensate for the additional white surface area so that such a display produces images with color balances that are substantially unchanged by the white reflective areas (although the display is enhanced in its relative brightness).

In one embodiment, the white interferometric modulators are grouped with the other white interferometric modulators, such as in an extra column as illustrated in FIG. 13. In another embodiment, the white interferometric modulators are distributed evenly throughout the pixel, e.g., interlaced between red, green, and blue display elements. Moreover, in some embodiments, the number of white display elements in each pixel is different from the numbers of, for example, red, green, or blue display elements.

In addition to using additional interferometric modulators configured to reflect white light to increase the intensity of reflected white light, embodiments of the pixel array 30 may be formed that increase the overall apparent brightness of the system by other means. For example, the human eye is more sensitive to green light than to other hues. Thus, in one embodiment, the apparent brightness of the interferometric modulator system is increased by using an additional green interferometric modulator in every pixel. For example, in some embodiments, there are an equal number of green, red, and blue interferometric modulators per pixel. In one embodiment, similar to that illustrated in FIG. 13, a second column of green interferometric modulators can be also included. In another embodiment, the pixel array 30 may include a 4th column, such as illustrated in FIG. 13, in which some of the display elements reflect white light and some reflect green light.

In one embodiment, the additional green interferometric modulators can be grouped with the other green interferometric modulators, such as in an extra column as illustrated in FIG. 13. In other embodiments, the additional green interferometric modulators can be distributed evenly throughout the pixel, e.g., interlaced between red, green, and blue display elements. Moreover, in some embodiments, the number of extra green display elements in each pixel can be different from the numbers of, for example, red, green, or blue display elements. In one embodiment, the display elements are interferometric modulators in which the optical path lengths, d, of the red and blue modulators are selected to compensate for the additional green pixels in the color balance of the display. Moreover, in one embodiment, the optical path lengths, d, of one or both of the red and blue display elements may be selected to produce a more saturated color. In one such embodiment, the optical path lengths, d, of the red or blue display elements may be selected to produce a higher order (2nd order or greater) reflected light. Second order corresponds to an optical path length, d, equal to $1 \times \lambda$. As interferometric modulators having a more saturated response reflect a smaller portion of incoming light, such modulators tend have less intense (darker) outputs. However, by increasing the relative intensity of reflected green light, such a display may be configured to have a brighter appearance to a viewer. In one embodiment, the ratio of area of red to blue is one to one while the area of green to red (or blue is greater than one to one. For example, in one embodiment, expressed as a percentage of total reflective area of each pixel, 33-50% of the pixel is green. In one embodiment, 38-44% of the pixel is green.

In one embodiment, the ratio of the surface area of the green interferometric modulators to the total reflective surface area of the pixel can be larger than the ratio of the surface area of the red and blue interferometric modulators in order to increase the perceived brightness. In another embodiment, the duration that the green interferometric modulators are in a reflecting state is increased to increase the green color relative to the duration of the other color generating interferometric modulators. In one embodiment, the blue and red interferometric modulators are tuned towards the green spectra to increase the appearance of green and thus increase the perceived brightness in the system. As will be recognized by one of skill in the art, a driver circuit can adjust input data to compensate for the additional green surface areas so that such a display produces images with color balances that are substantially unchanged by the additional green reflective areas (although the display is enhanced in its relative brightness). In one embodiment, the extra green display elements are used in display modes where brightness is more important than color accuracy, e.g., text display.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display, comprising:
   a plurality of pixels, each of the pixels comprising:
   at least one red subpixel comprising at least one interferometric modulator configured to output red light;
   at least one green subpixel comprising at least one interferometric modulator configured to output green light;
   at least one blue subpixel comprising at least one interferometric modulator configured to output blue light; and
   at least one white subpixel comprising at least one interferometric modulator configured to output colored light, wherein said red, green, and blue subpixels are configured to produce white light together in a manner different than said at least one white subpixel.

2. The display of claim 1, wherein said display is configured to output white light having a standardized white point.

3. The display of claim 2, wherein said standardized white point is one of D55, D65, or D75.

4. The display of claim 1, wherein said at least one interferometric modulator configured to output colored light comprises at least one interferometric modulator configured to output cyan light and at least one interferometric modulator configured to output yellow light, wherein said cyan light and said yellow light combine to produce said white light.

5. The display of claim 1, further comprising:
   at least one filter associated with said at least one interferometric modulator configured to output colored light, the at least one filter configured to selectively transmit visible wavelengths associated with magenta light and substantially filter other visible wavelengths when illuminated with white light; and
   wherein said at least one interferometric modulator configured to output colored light comprises at least one interferometric modulator configured to selectively reflect green light incident thereon.

6. The display of claim 5, wherein said filter comprises an absorption filter.

7. A display, comprising:
   a pixel comprising a plurality of interferometric modulators, said plurality of interferometric modulators comprising:
   at least one interferometric modulator configured to output red light;
   at least one interferometric modulator configured to output green light;
   at least one interferometric modulator configured to output blue light; and
   at least one interferometric modulator configured to output white light,
   wherein said at least one interferometric modulator configured to output white light outputs white light having a standardized white point.

8. The display of claim 7, wherein said at least one interferometric modulator configured to output red light, said at least one interferometric modulator configured to output green light, said at least one interferometric modulator configured to output blue light are configured to output light that combines to produce white light having a second standardized white point.

9. The display of claim 8, wherein said standardized white point of said at least one interferometric modulator configured to output white light substantially matches said second standardized white point.

10. The display of claim 7, wherein said standardized white point is one of D55, D65, or D75.

11. The display of claim 7, further comprising a source of illumination for said plurality of interferometric modulators, said source of illumination having a different white point than said output white light having said standardized white point.

12. The display of claim 7, wherein said at least one interferometric modulator configured to output white light comprises at least one interferometric modulator configured to output cyan light and at least one interferometric modulator configured to output yellow light, wherein said cyan light and said yellow light combine to produce said white light.

13. The display of claim 7, wherein said at least one interferometric modulator configured to output white light comprises a broadband reflector.

14. The display of claim 7, wherein the white light is characterized by three visible peaks in its spectral response.

15. The display of claim 14, wherein the three visible peaks correspond to a red peak, a green peak, and a blue peak.

16. A display, comprising:
   a pixel comprising a plurality of display elements, each of said display elements comprising a reflective surface configured to be moved and positioned at a distance from a partially reflective surface, said plurality of display elements comprising at least one of said plurality of display elements configured to output colored light and at least one of said plurality of display elements configured to interferometrically output white light, wherein said at least one color display element is included in a plurality of color display elements that together are configured to produce white light in a manner different than said at least one display element configured to output white light.

17. The display of claim 16, wherein said at least one display element configured to output white light outputs white light characterized by a standardized white point.

18. The display of claim 17, wherein said standardized white point is one of D55, D65, or D75.

19. The display of claim 16, further comprising a source of illumination for the plurality of display elements.

20. The display of claim 19, wherein the source of illumination has a different white point than said light reflected by said display.

21. The display of claim 16, wherein at least one of said plurality of display elements comprises a filter configured to selectively transmit certain visible wavelengths and substantially filter other visible wavelengths.

22. The display of claim 16, wherein said plurality of display elements comprises at least one display element configured to output red light, at least one display element configured to output green light, and at least one display element configured to output blue light.

23. The display of claim 16, further comprising at least one filter associated with at least one of said plurality of display elements and said filter is configured to selectively transmit certain visible wavelengths and substantially filter other visible wavelengths when illuminated with white light.

24. The display of claim 16, wherein the at least one of said plurality of display elements configured to output white light comprises at least one interferometric modulator configured to output cyan light and at least one interferometric modulator configured to output yellow light.

25. The display of claim 16, wherein said plurality of display elements comprises a plurality of interferometric modulators.

26. The display of claim 14, further comprising:
a processor that is in electrical communication with said plurality of display elements, said processor being configured to process image data;
a memory device in electrical communication with said processor.

27. The display of claim 24, further comprising:
a driver circuit configured to send at least one signal to said plurality of display elements.

28. The display of claim 27, further comprising:
a controller configured to send at least a portion of said image data to said display circuit.

29. The display of claim 26, further comprising:
an image source module configured to send said image data to said processor.

30. The display of claim 29, wherein said image source module comprises at least one of a receiver, transceiver, and transmitter.

31. The display of claim 26, further comprising:
an input device configured to receive input data and to communicate said input data to said processor.

32. The display of claim 6, wherein the at least one of said plurality of display elements configured to output white light comprises at least one interferometric modulator having an optical path length between said reflective surface and said partially reflective surface which corresponds to a common multiple of a plurality of visible resonant wavelengths.

33. The display of claim 32, wherein the plurality of visible resonant wavelengths comprise a red resonant wavelength, a green resonant wavelength, and a blue resonant wavelength.

34. The display of claim 16, wherein the at least one display element configured to output white light comprises a display element that outputs white light characterized by three visible peaks in its spectral response.

35. The display of claim 34, wherein the three visible peaks correspond to a red peak, a green peak, and a blue peak.

36. A method of fabricating a display, comprising:
forming a pixel, wherein forming a pixel comprises forming a plurality of display elements configured to output light, each of said plurality of display elements comprising a reflective surface configured to be moved and positioned at a distance from a partially reflective surface,
wherein each of said respective distances is selected so that at least one of the plurality of display elements is configured to output colored light and at least one other of said plurality of display elements is configured to interferometrically output white light, and wherein said at least one color display element is included in a plurality of color display elements that together are configured to produce white light in a manner different than said at least one display element configured to output white light.

37. The method of claim 36, wherein said at least one display element configured to output white light outputs white light characterized by a standardized white point.

38. The method of claim 37, wherein said respective distances are selected so that light reflected by said display has a different white point than light illuminating said display.

39. The method of claim 38, wherein said respective distances are selected so that said white point is one of D55, D65, or D75.

40. The method of claim 36, wherein forming said at least one of said plurality of display elements configured to output colored light comprises forming at least one display element configured to output red light, at least one display element configured to output green light, and at least one display element configured to output blue light.

41. A display fabricated by said method of claim 36.

42. The method of claim 36, wherein the at least one of said plurality of display elements configured to output white light comprises at least one interferometric modulator configured to output cyan light and at least one interferometric modulator configured to output yellow light.

43. The method of claim 36, wherein the at least one of said plurality of display elements configured to output white light comprises at least one interferometric modulator having an optical path length between said reflective surface and said partially reflective surface which corresponds to a common multiple of a plurality of visible resonant wavelengths.

44. The method of claim 43, wherein the plurality of visible resonant wavelengths comprise a red resonant wavelength, a green resonant wavelength, and a blue resonant wavelength.

45. The method of claim 36, wherein the at least one display element configured to output white light comprises a display element that outputs white light characterized by three visible peaks in its spectral response.

46. The method of claim 45, wherein the three visible peaks correspond to a red peak, a green peak, and a blue peak.

47. A display, comprising a pixel, said pixel comprising:
means for outputting colored light; and
means for interferometrically outputting white light, said means for outputting colored light and said means for interferometrically outputting white light comprising microelectromechanical systems, wherein said means for outputting colored light is included in a plurality of other means for outputting colored light that together are configured to output white light in a manner different than said means for interferometrically outputting white light.

48. The display of claim 47, wherein said means for outputting colored light and said means for interferometrically outputting white light comprise a plurality of display elements, each of said display elements comprising a reflective surface configured to be moved and positioned at a distance from a partially reflective surface.

49. The display of claim 48, wherein means for outputting white light comprises at least one interferometric modulator having an optical path length between said reflective surface and said partially reflective surface which corresponds to a common multiple of a plurality of visible resonant wavelengths.

50. The display of claim 49, wherein the plurality of visible resonant wavelengths comprise a red resonant wavelength, a green resonant wavelength, and a blue resonant wavelength.

51. The display of claim 47, further comprising means for selectively transmitting certain visible wavelengths and substantially filtering other visible wavelengths.

52. The display of claim 47, wherein said means for interferometrically outputting white light comprises means for outputting white light having a standardized white point.

53. The display of claim 52, wherein said standardized white point is one of D55, D65, or D75.

54. The display of claim 47, further comprising means for illumination having a different white point than white light produced by said means for outputting colored light and said means for interferometrically outputting white light.

55. The display of claim 47, wherein means for outputting white light comprises means for outputting cyan light and means for outputting yellow light.

56. The display of claim 47, wherein means for outputting white light outputs white light characterized by three visible peaks in its spectral response.

57. The display of claim 56, wherein the three visible peaks correspond to a red peak, a green peak, and a blue peak.

58. A display comprising:
a plurality of pixels each comprising red, green, and blue interferometric modulators that are configured to output red, green, and blue light, respectively,
wherein each of said pixels are configured to output a greater intensity of green light than red light and configured to output a greater intensity of green light than blue light when each of said interferometric modulators are set to output red, green, and blue light.

59. The display of claim 58, wherein each of said interferometric modulators of each of the plurality of pixels has a reflecting area and wherein said green interferometric modulators of each pixel has a total reflecting area larger than said red interferometric modulators of each pixel and than said blue interferometric modulators of each pixel.

60. The display of claim 58, wherein each of said plurality of pixels comprises more interferometric modulators configured to output green light than interferometric modulators configured to output blue light.

61. The display of claim 58, wherein each of said plurality of pixels comprises more interferometric modulators configured to output green light than interferometric modulators configured to output red light.

62. The display of claim 58, wherein said interferometric modulators configured to output red light are configured to output red light having a wavelength selected to compensate for said greater intensity of green light.

63. The display of claim 58, wherein said interferometric modulators configured to output red light are characterized by an optical path length and wherein said optical path length of said interferometric modulators configured to output red light is substantially equal to about one wavelength,λ, associated with red light to produce a second order red reflection.

64. The display of claim 58, wherein said interferometric modulators configured to output blue light are configured to output blue light having a wavelength selected to compensate for said greater intensity of green light.

65. The display of claim 58, wherein said interferometric modulators configured to output blue light are characterized by an optical path length and wherein said optical path length of said interferometric modulators configured to output blue light is substantially equal to about one wavelength,λ, associated with blue light to produce a second order blue reflection.

66. A method of fabricating a display, comprising:
forming a plurality of pixels, forming said plurality of pixels comprising:
forming interferometric modulators configured to output red light;
forming interferometric modulators configured to output green light; and
forming interferometric modulators configured to output blue light,
wherein each of said pixels are configured to output a greater intensity of green light than red light and configured to output a greater intensity of green light than blue light when each of said interferometric modulators are set to output red, green, and blue light.

67. The method of claim 66, wherein each of said interferometric modulators of each of the plurality of pixels has a reflecting area and wherein said green interferometric modulators of each pixel has a total reflecting area larger than said red interferometric modulators of each pixel and than said blue interferometric modulators of each pixel.

68. The method of claim 66, wherein each of said plurality of pixels comprises more interferometric modulators configured to output green light than interferometric modulators configured to output blue light.

69. The method of claim 66, wherein each of said plurality of pixels comprises more interferometric modulators configured to output green light than interferometric modulators configured to output red light.

70. The method of claim 66, wherein forming said interferometric modulators configured to output red light comprises forming said interferometric modulators to output red light having a wavelength selected to compensate for said greater intensity of green light.

71. The method of claim 66, wherein forming said interferometric modulators configured to output blue light comprises forming said interferometric modulators to output blue light having a wavelength selected to compensate for said greater intensity of green light.

72. A display comprising:
a plurality of pixels, each comprising red, green, and blue interferometric modulators that are configured to output red, green, and blue light, respectively,
wherein each of said pixels are configured to output a greater intensity of green light than red light and configured to output a greater intensity of green light than blue light, and
wherein at least one of said interferometric modulators configured to output red light and said interferometric modulators configured to output blue light are configured to output light having a wavelength selected to compensate for said greater intensity of green light.

73. The display of claim 72, further comprising a circuit configured to drive each of said red, green, and blue interferometric modulators for respective periods of time and wherein said period of time associated with said green interferometric modulators is greater than said respective periods of time associated with said red and blue interferometric modulators.

74. The display of claim 72, wherein said wavelength is selected to be substantially equal to about one wavelength,$\lambda$, associated with red light to produce a second order red reflection.

75. The display of claim 72, wherein said wavelength is selected to be substantially equal to about one wavelength,$\lambda$, associated with blue light to produce a second order blue reflection.

76. The display of claim 72, wherein each of said pixels are configured to output a greater intensity of green light than red light and configured to output a greater intensity of green light than blue light when each of the red, green, and blue interferometric modulators in each said pixels are set to output red, green, and blue light.

77. The display of claim 72, wherein each of said interferometric modulators of each of the plurality of pixels has a reflecting area and wherein green interferometric modulators of each pixel have a total reflecting area larger than red interferometric modulators of each pixel and than blue interferometric modulators of each pixel.

* * * * *

UNITED STATES PATENT AND TRADEMARK OFFICE
CERTIFICATE OF CORRECTION

PATENT NO.        : 8,031,133 B2
APPLICATION NO.   : 11/178211
DATED             : October 4, 2011
INVENTOR(S)       : Brian J. Gally and William J. Cummings It is certified that error appears in the above-identified patent and that said Letters Patent is hereby corrected as shown below:

On page 1, Item 56, under U.S. PATENT DOCUMENTS, please add the following:

| | | |
|---|---|---|
| 4,929,061 | 05/29/1990 | Tominaga, et al. |
| 5,345,322 | 09/06/1994 | Fergason, et. al. |
| 5,835,255 | 11/10/1998 | Miles |
| 6,057,878 | 05/02/2000 | Ogiwara |
| 6,147,728 | 11/14/2000 | Okumura |
| 6,597,419 | 07/22/2003 | Okada |
| 6,657,611 | 12/02/2003 | Sterken |
| 6,806,924 | 10/19/2004 | Niiyama |
| 7,110,158 | 09/19/2006 | Miles |
| 7,113,339 | 09/26/2006 | Taguchi, et. al. |
| 2002/0006044 | 01/17/2002 | Harbers |
| 2003/0179383 | 09/25/2003 | Chen |
| 2004/0114242 | 06/17/2004 | Sharp |
| 2005/0083352 | 04/21/2005 | Higgins |
| 2006/0066541 | 03/30/2006 | Gaily |
| 2006/0066935 | 03/30/2006 | Cummings, et al. |

On page 2, under FOREIGN PATENT DOCUMENTS, please add the following:

| | | |
|---|---|---|
| CN 1409157 | 04/09/2003 | Obotericks Co. Ltd. |
| EP 0 330 361 | 08/30/1989 | General Electric |
| EP 0 830 032 | 03/18/1998 | Texas Instruments Inc. |
| EP 1 298 635 | 04/02/2003 | Optrex KK |
| EP 1 640 761 | 03/29/2006 | IDC,LLC |

Signed and Sealed this
Tenth Day of July, 2012

David J. Kappos
*Director of the United States Patent and Trademark Office*

CERTIFICATE OF CORRECTION (continued)
U.S. Pat. No. 8,031,133 B2

| | | |
|---|---|---|
| EP 1 640 762 | 03/29/2006 | IDC,LLC |
| EP 1 767 981 | 03/28/2007 | IDC,LLC |
| EP 1807725 | 7/18/2007 | IDC, LLC |
| GB 2 321 532 | 07/29/1998 | Sharp Kabushiki Kaisha |
| JP 09 281917 | 10/31/1997 | Dai Nippon Printing Co. Ltd. |
| KR 2002 010322 | 02/04/2002 | LG Philips Co. Ltd. |
| WO 97/17628 | 05/15/1997 | Etalon Inc. |
| WO 2006/036519 | 04/06/2006 | IDC,LLC |

On page 3, under OTHER PUBLICATIONS, please add the following:

Official Communication in Malaysian Application No. PI 20054446, (IRDM.166VMY) dated November 20, 2009.
Official Communication in Russian Application No. 2007115885/28, (IRDM.166VRU) dated September 22, 2009.
MANZARDO et. al., "Optics and Actuators for Miniaturized Spectrometers," International Conf. on Optical MEMS, Volume 12, Issue 6, pp. 23-24, December 2003.
MARK W. MILES, "A New Reflective FPD Technology Using interferometric modulation" Journal of the Society or Information Display Vol. 5 No.4 pp.379-382, 1997.
MARK W. MILES, "Interferometric Modulation: A MEMS Based Technology for the Modulation of Light," Final Program and Proceedings IS&T's 50th Annual Conference, pp.674-677, 1997.
MARK W. MILES, "MEMS-based Interferometric Modulator for Display Applications," Proceedings of SPIE Micromachined Devices and Components, pp.20-28, 1999.
Austrian Search Report for U.S. Application No. 11/118,605 (IRDM.065A2) dated July 14, 2005.
Austrian Search Report for U.S. Application No. 11/118110 (IRDM.065A1) dated August 12, 2005.
Extended European Search Report in App. No. 05255635.4 (IRDM.065VEP1; Publication No. EP 1 640 761) dated January 19, 2006.

Extended European Search Report in App. No. 05255636.2 (IRDM.065VEP2; Publication No. EP 1 640 762) dated April 28, 2006.
Extended European Search Report in App. No. 06077032.8 (IRDM.065VREP2; Publication No. EP 1 767 981) dated May 25, 2007.
Official Communication – Election/Restrictions in U.S. Application No. 11/118,110, (IRDM.065A1; Publication No. 2006-0077148 A1) dated September 3, 2008.
Response to Official Communication - Election/Restrictions in U.S. Application No. 11/118,110, (IRDM.065A1; Publication No. 2006-0077148 A1) dated October 3, 2008.
Office Action in U.S. Application No. 11/118,110, (IRDM.065A1; Publication No. 2006-0077148 A1) dated November 26, 2008.
Amendment in U.S. Application No. 11/118,110, (IRDM.065A1; Publication No. 2006-0077148 A1) dated February 26, 2009.
Office Action in U.S. Application No. 11/118,110, (IRDM.065A1; Publication No. 2006-0077148 A1) dated May 14, 2009.
Amendment in U.S. Application No. 11/118,110, (IRDM.065A1; Publication No. 2006-0077148 A1) dated November 10, 2009.
Office Action in U.S. Application No. 11/118,110, (IRDM.065A1; Publication No. 2006-0077148 A1) dated December 18, 2009.
Official Communication - Election/Restrictions in U.S. Application No. 11/118,605, (IRDM.065A2; Publication No. 2006-0077149 A1) dated January 17, 2008.
Response to Official Communication - Election/Restrictions in U.S. Application No. 11/118,605, (IRDM.065A2; Publication No. 2006-0077149 A1) dated February 15, 2008.
Official Action in U.S. Application No. 11/118,605, (IRDM.065A2; Publication No. 2006-0077149 A1) dated May 15, 2008.
Amendment in U.S. Application No. 11/118,605, (IRDM.065A2; Publication No. 2006-0077149 A1) dated August 13, 2008.
Official Action in U.S. Application No. 11/118,605, (IRDM.065A2; Publication No. 2006-0077149 A1) dated December 15, 2008.
Examiner Interview Summary in U.S. Application No. 11/118,605, (IRDM.065A2; Publication No. 2006-0077149 A1) dated February 20, 2009.
Request for Continued Examination (RCE), Amendment, and Applicant Summary of Interview in U.S. Application No. 11/118,605, (IRDM.065A2; Publication No. 2006-0077149 A1) dated March 16, 2009.

CERTIFICATE OF CORRECTION (continued)
U.S. Pat. No. 8,031,133 B2

Official Communication - Election/Restrictions in U.S. Application No. 11/118,605, (IRDM.065A2; Publication No. 2006-0077149 A1) dated April 10, 2009.
Response to Official Communication - Election/Restrictions in U.S. Application No. 11/118,605, (IRDM.065A2; Publication No. 2006-0077149 A1) dated May 11, 2009.
Official Action in U.S. Application No. 11/118,605, (IRDM.065A2; Publication No. 2006-0077149 A1) dated July 9, 2009.
Examiner Interview Summary in U.S. Application No. 11/118,605, (IRDM.065A2; Publication No. 2006-0077149 A1) dated December 8, 2009.
Amendment and Applicant Summary of Interview in U.S. Application No. 11/118,605, (IRDM.065A2; Publication No. 2006-0077149 A1) dated December 9, 2009.
Official Communication in European Application No. 05255635 (IRDM.065VEP1; Publication No. 1640761), dated October 12, 2006.
Official Communication in European Application No. 05255636 (IRDM.065VEP2; Publication No. 1640762), dated January 5, 2007.
Official Communication in Mexican Application No. PA/a/2005/009863 (IRDM.065VMX2), dated April 4, 2008.
Official Communication in Mexican Application No. PA/a/2005/010238 (IRDM.065VMX1), dated May 7, 2008.
Official Communication in Chinese Application No. 200510105830 (IRDM.065VCN1), dated May 9, 2008.
Official Communication in Chinese Application No. 200510105840 (IRDM.065VCN2), dated May 9, 2008.
Official Communication in Mexican Application No. PA/a/2005/010238 (IRDM.065VMX1), dated July 16, 2008.
Official Communication in Japanese Application No. 2005259341 (IRDM.065VJP2), dated October 7, 2008.
Official Communication in Mexican Application No. PA/a/2005/010238 (IRDM.065VMX1), dated December 1, 2008.
Official Communication in Chinese Application No. 200510105830 (IRDM.065VCN1), dated February 20, 2009.
Official Communication in Chinese Application No. 200510105840 (IRDM.065VCN2), dated February 27, 2009.

CERTIFICATE OF CORRECTION (continued)
U.S. Pat. No. 8,031,133 B2

Official Communication in Mexican Application No. PA/a/2005/010238 (IRDM.065VMX1), dated February 26, 2009.
Official Communication in Japanese Application No. 2005276235 (IRDM.065VJP1), dated May 12, 2009.
Official Communication in Australian Application No. 2005204236 (IRDM.065VAU2), dated December 14, 2009.
Official Communication in Russian Application No. 2005129978 (IRDM.065VRU1), dated December 23, 2009.
Official Communication in Malaysian Application No. PI 20054365, (IRDM.065VMY1) dated December 31, 2009.
Requirement for Restriction/Election in U.S. Application No. 11/208085, (IRDM.167A1), dated August 13, 2008.
Response to Election/Restriction Filed in U.S. Application No. 11/208085, (IRDM.167A1), dated October 13, 2008.
Office Action in U.S. Application No. 11/208085, (IRDM.167A1), dated December 10, 2008.
Amendment in U.S. Application No. 11/208085, (IRDM.167A1), dated June 8, 2009.
Notice of Allowance in U.S. Application No. 11/208085, (IRDM.167A1), dated September 14, 2009.
Request for Continued Examination and Information Disclosure Statement in U.S. Application No. 11/208085, (IRDM.167A1), dated November 13, 2009.
Preliminary Amendment in U.S. Application No. 11/208085, (IRDM.167A1), dated December 14, 2009.
Notice of Allowance in U.S. Application No. 11/208085, (IRDM.167A1), dated December 29, 2009.
Comments on Statement of Reasons for Allowance in U.S. Application No. 11/208085, (IRDM.167A1), dated March 26, 2010.
Amendment After Notice of Allowance Under 37 C.F.R. §1.312 in U.S. Application No. 11/208085, (IRDM.167A1), dated March 26, 2010.
International Search Report and Written Opinion in Application No. PCT/US2005/032335 (IRDM.167VPC), dated December 30, 2005.
International Preliminary Report on Patentability and Written Opinion in Application No. PCT/US2005/032335 (IRDM.167VPC), dated April 5, 2007.

On page 3, column 1, line 32, under OTHER PUBLICATIONS, please change "Interferonnetric" to --Interferometric--.

On page 3, column 2, line 23, under OTHER PUBLICATIONS, please change "11/118,110, dated Apr. 4, 2011." to --11/118,605, dated Apr. 4, 2011.--.

In column 21, line 41, in claim 26, please change "claim 14" to --claim 16--.

In column 21, line 47, in claim 27, please change "claim 24" to --claim 26--.

In column 21, line 62, in claim 32, please change "claim 6" to --claim 16--.

In column 24, line 7, in claim 63, please change "wavelength,$\lambda$," to --wavelength, $\lambda$,--.

CERTIFICATE OF CORRECTION (continued)
U.S. Pat. No. 8,031,133 B2

In column 24, line 16, in claim 65, please change "wavelength,λ," to --wavelength, λ,--.

In column 25, line 8, in claim 74, please change "wavelength,λ," to --wavelength, λ,--.

In column 25, line 12, in claim 75, please change "wavelength,λ," to --wavelength, λ,--.